March 21, 1950 W. F. EAMES 2,501,320
CONTROL SYSTEM
Filed Aug. 10, 1944 9 Sheets-Sheet 1

WITNESSES:
E. A. McCloskey
Birney Hines

INVENTOR
William F. Eames.
ATTORNEY

March 21, 1950 W. F. EAMES 2,501,320
CONTROL SYSTEM
Filed Aug. 10, 1944 9 Sheets-Sheet 3

WITNESSES:

INVENTOR
William F. Eames
BY
ATTORNEY

Fig. 4A.

March 21, 1950 W. F. EAMES 2,501,320
CONTROL SYSTEM
Filed Aug. 10, 1944 9 Sheets-Sheet 9

WITNESSES:

INVENTOR
William F. Eames.
ATTORNEY

Patented Mar. 21, 1950

2,501,320

UNITED STATES PATENT OFFICE 2,501,320

CONTROL SYSTEM

William F. Eames, Westfield, N. J., assignor, by mesne assignments, to Westinghouse Electric Corporation, East Pittsburgh, Pa., a corporation of Pennsylvania Application August 10, 1944, Serial No. 548,826

27 Claims. (Cl. 187—29)

My invention relates to systems of control for electric elevators and, more particularly, to such systems as include a plurality of cars, operating together as a bank and controlled by passenger operated push buttons located at the various floor landings.

Although not limited thereto, my invention is particularly applicable to elevator systems in which the cars are driven at relatively high speeds and are automatically stopped at the floors by automatic landing equipment in response to operated push buttons in the cars and at the various floors. Such systems provide a particularly efficient passenger service for office buildings and tall structures having a large number of floors and a relatively large volume of passenger traffic.

However, there is a tendency for the cars in such elevator systems to become bunched in one part of the system and fail to promptly answer stop calls in the other parts of the system. For instance, at noon and in the evening when there is a rush on the part of the tenants to leave the building, the down stop calls at the lower floors may remain unanswered for an undesirable length of time because the cars become so loaded at the upper floors that they cannot stop to take on down passengers at the lower floors until the rush subsides.

Therefore, one object of my invention is to provide special control features which will cause any call to be answered within a reasonable length of time.

Another object is to provide an elevator system with a demand zone, in which calls remaining unanswered for a predetermined length of time by cars in their own direction will cause cars moving in an opposite direction to stop and answer them.

Another object is to provide a system in which a down stop call registered by a down passenger at a floor will cause a down car to stop in answer to it, but if no down car stops for it within a predetermined time, then an up moving car will stop and reverse to answer it.

A further object is to provide a system in which an up moving car will reverse and answer a down call which has existed longer than a predetermined period or a plurality of down calls which have not been answered within a reasonable but shorter period.

Another object is to provide a system in which the demand for down service at the lower floors set up by operated down stop call buttons and the length of time they have been operated without being answered may be used to stop and reverse an up moving car to answer such down call service whether such demand is created by a plurality of down stop calls of fairly long duration or a single down call of longer than a predetermined duration.

A further object is to provide an elevator system in which a selected number of cars may be conditioned to stop and reverse for down call service when an answer to one down call is delayed beyond a predetermined time or a plurality of down calls remain unanswered sufficiently long to set up a demand for special service, the stopping and reversing of the car depending upon the number of unanswered calls considered in connection with the length of time they have remained unanswered.

A further object is to provide for changing the number of unanswered calls and time they remain unanswered necessary to stop and reverse an up moving car for down call service.

A still further object is to provide a means responsive to a first up moving car stopping and reversing for down service to prevent a second up moving car from stopping and reversing for down call service until a still greater down call service exists than was necessary to stop and reverse the first up moving car.

A still further object is to provide means for adjusting the control means of a car to change its response to a given demand for down call service.

A still further object is to provide a system in which the amount of accumulation of demand for down call service will stop and reverse an up moving car to answer such demand for down call service.

A still further object is to provide a system in which a predetermined demand for down call service, depending on the accumulation of down calls and the length of time they have existed, will stop and reverse an up moving car to answer such down call service and in which a further accumulation of such down service will stop and reverse a second up moving car to assist in answering such down call service.

Other objects of the invention will become evident from the following detailed description taken in conjunction with the accompanying drawings, in which.

Figure 1:
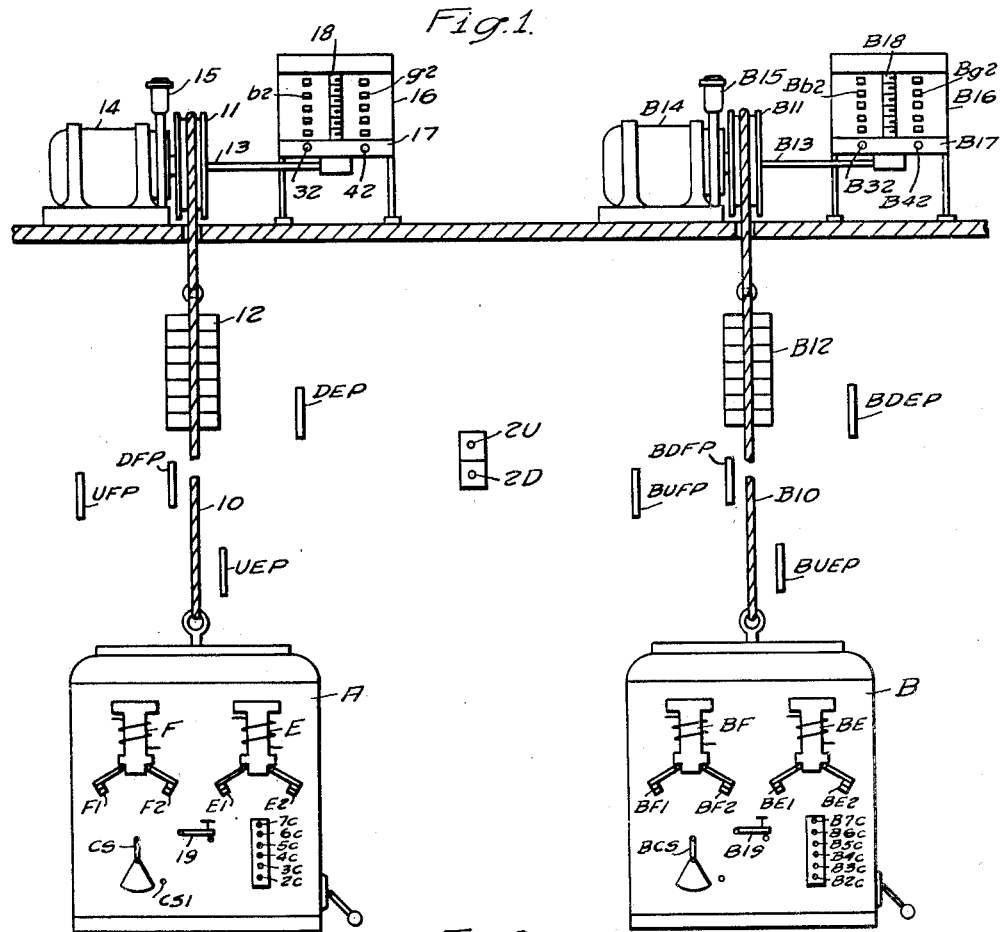
Figure 1 is a diagrammatic representation of an elevator system embodying my invention.

Figs. 3, 4, 5 and 6 collectively constitute a diagrammatic representation in straight-line style of the circuit connections for the two-car elevator system illustrated in Fig. 1. These figures should be assembled vertically in numerical order with Fig. 3 at the top.

Figs. 3A to 6A, inclusive, are key representations of the relays in Figs. 3 to 6, inclusive, illustrating the coils and contact members disposed in horizontal alignment with their positions in the straight-line circuits of Figs. 3 to 6. Figs. 3A to 6A should be placed beside the corresponding Figs. 3 to 6 to facilitate the location of the various coils and contacts.

Briefly, the system utilizes an accumulation of demand for service in the shape of unanswered stop calls in one direction at a group of selected floors for causing reversal of a car moving in the opposite direction to answer such stop calls. In general, the Service Demand may be defined as a function or summation of the number of unanswered registered floor calls in the group and the time they have remained unanswered.

It may be assumed, for instance, that one call remaining unanswered for more than 45 seconds may be said to constitute a Service Demand; or two calls unanswered for 20 and 25 seconds, respectively, equal a Service Demand; or three calls of 10, 15 and 20 seconds, respectively, equal a Service Demand; or one call of 30 seconds and two newly registered calls at other floors, respectively, equal a Service Demand.

In accordance with my invention, I provide a means responsive to the existence of a service demand determined by predetermined number of demand units based on the number of calls and the time they have been registered for biasing the car control system to a quicker response to the unanswered calls; as, for example, by stopping and reversing an up moving car to cause it to answer unanswered down hall calls at such lower floors as may have been selected as a demand zone. Of course, the units may have any demand value desired and the demand zone may include any number of floors and may be for either up or down direction.

Another feature of the system is that certain floors can be weighted; that is, a call at a densely populated floor can be given twice the service demand unit value of another floor known to be lightly populated. Fractional values of weighting can be as easily used as unit multiples. Likewise, certain floors can be weighted with respect to length of wait so that they will be less likely to have a long wait than adjacent floors.

In operation, a car, set to respond to down demand service in the lower floors, will run up and accumulate the demand of the floors passed until a predetermined value of demand exists below the car's position. At this point an adjustable service demand relay associated with the car will pick up and cause the car to stop and reverse either at the uppermost down calling floor of the group which caused the action or at the next down call above the group. The car will then proceed downwardly and respond to the down calls at the lower floors. A second car which may be following the first closely, will not answer the demand, because the first car, by its reversal, will set up such a circuit that an increased demand is required to reverse the second car. This second car then may travel on up the shaft until an additional demand accumulates below it sufficient to cause it to stop and reverse at a still higher floor.

To prevent the lower floors from monopolizing the elevator service under extreme conditions, one or more cars should be nonresponsive to the service demand, or at least require such a large demand factor that only under extreme conditions will it be reversed at other than the topmost call of the installation. On the other hand, if desired, one or more cars can be made responsive to a relatively small demand, such that it will be monopolized by a few of the lowermost floors under extreme conditions.

It will be seen that the system is very flexible and that different weightings can be given to different floors by a manual switch or automatically by a clock-driven switch, if so desired. Likewise, the responsiveness of cars to the service demand can be varied either manually or automatically, to meet varying conditions in a building during the day.

The elevator system is illustrated as provided with two cars A and B for serving seven floors. This number of cars and this number of floors have been selected for the purpose of simplifying the disclosure as much as possible, but it is to be understood that the invention may be used for any reasonable number of cars in a bank serving any reasonable number of floors. For example, the invention would be suitable for an installation of six cars serving thirty floors.

The mechanical devices are given reference numerals starting with "10". The relays, switches, etc., are given reference characters of letters with prefixes and suffixes to indicate various attributes. For example in the character 2DR5, the number 2 means second floor, the letter D means down direction, the letter R means call registering relay, and the number 5 means the particular pair of contacts on that relay, so that the whole term indicates at a glance the contacts 5 of the down call registering relay for the second floor.

For the sake of simplicity, the apparatus individual to each car will be given the same reference characters except that the apparatus for car B will be given the prefix B to indicate that it is for car B instead of for car A.

*Apparatus individual to car A*

D—down switch
E—slow-down inductor relay
F—stopping inductor relay
G—inductor holding relay
H—high car-call relay
J—high call reversing relay
K—high floor call relay
KN—no floor call relay
M—car running relay
P—inductor plates
S—floor call stopping relay
T—car call stopping relay
U—up direction switch
V—high speed relay
W—up direction preference relay
X—down direction preference relay
DM—demand relay
SA—demand stopping relay
Y—relay for preparing relay SA
DR—door relay
19—switch making car responsive to service demand

*Apparatus common to both cars*

7DR, 6DR, 5DR, 4DR, 3DR, 2DR } Down call-storing relays.

6UR, 5UR, 4UR, 3UR, 2UR } Up call-storing relays.

3T1, 3T2, 3T3 } Time delay relays for third floor hall calls (same for each floor)

Apparatus in Fig. 1 of the drawings

Referring more particularly to Fig. 1 of the drawings, car A is supported in a hatchway by a cable 10 which passes over a sheave 11 to a counterweight 12. The sheave 11 is mounted for rotation by a shaft 13 driven by a motor 14. A brake 15 of the usual spring-operated, electromagnetically-released type is provided for stopping further rotation of the sheave 11 when the motor 14 is deenergized.

A floor selector 16, of any suitable type, is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes which are disposed, upon movement of the car, to successively engage stationary contacts arranged in rows on the selector in position to correspond to the floors of the building. For simplicity, only two brushes, 32 and 42, and two rows of contact segments, b2 and g2, etc., are illustrated in Fig. 1, but it will be understood that in the system to be described herein, as well as in practice, a much larger number of brushes and rows of contact segments is required.

A starting switch CS is mounted in the car to be operated by the attendant to start the car. Any other starting means may be used. After the car starts, the switch is centered to leave the control system in such condition that the car will stop automatically in response to operated hall buttons at the floor landings or floor stop buttons in the car.

The car buttons 2c, etc., (one for each floor) are mounted in the car, so that the attendant may, be pressing them, cause the car to stop automatically at any floor. The direction of operation of the car is controlled by relays W and X as will be described in connection with Fig. 3.

The hall buttons comprise an up button and a down button at each floor intermediate the terminals and a down button at the top terminal. The car will be stopped at the lower terminal and also at the upper terminal by the usual limit switches such as VTU, VTD, STU, and STD described in connection with Fig. 3. The lower terminal will be used as the parking floor so that no button is needed thereat.

In order to automatically effect accurate stopping of car A at the floors in response to operation of the floor buttons in the car, or by operation of the hall buttons, a slowdown inductor relay E and a stopping inductor relay F are mounted on the car in position to cooperate with suitable inductor plates of iron or other magnetic material, mounted in the hatchway adjacent to each floor. Only the up plates UEP and UFP and the down plates DEP and DFP for the second floor are illustrated. Similar plates are provided for each floor, except that the top terminal has only up plates and the bottom terminal only down plates.

The inductor relays E and F, when their coils are energized, have normally incomplete magnetic circuits which are successively completed by the inductor plates as the car approaches a floor at which a stop is to be made. These relays are so designed that energization of their operating coils will not produce operation of their contacts until the relay is brought opposite its inductor plate, thereby completing the relay magnetic circuit. Upon operation of the relay contacts (such as E1 or E2) they remain in operated condition until the relay operating coil is deenergized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the car may be used if so desired.

The cars are provided with a high call reversal system in which the cars stop for up calls on their up trips but automatically stop and reverse at the highest down call when no service is required above that highest down call. If the car attendant desires, for any reason, to go above the highest down call while on an up trip he can do so by pressing a car call button, 6c, etc., for a floor above to cause the car to keep on up to such floor.

In accordance with my invention, each car has a conditioning switch (19 in car A) by means of which it may be conditioned to respond to the Service Demand means to stop and reverse, while moving upwardly, to answer down stop calls when they are sufficient in number or duration or both to create a Service Demand at predetermined lower floors. When switch 19 is in its open position, the car will not respond to the Service Demand for down call service.

Figure 2:
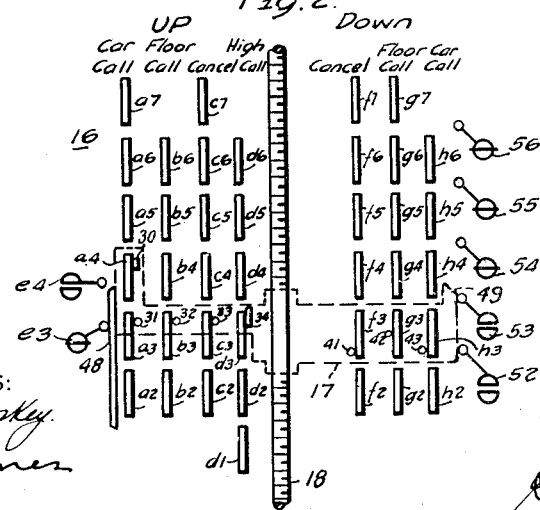
Fig. 2 is a diagrammatic representation of the stationary contact segments and the moving brushes on a floor selector for one of the elevator cars embodied in Fig. 1, with the brushes disposed in the position they will be in when the car is stopped at the third floor.

Apparatus in Fig. 2

Fig. 2 is an enlarged view of the floor selector 16 of Fig. 1. In this figure, the various stationary contact segments are represented by rectangles and the contacting brushes by small circles and by rectangles. The brush carriage 17 is shown by dotted lines in the position it occupies when the associated car is at the third floor.

The contact segments a2 to a7 on the floor selector are disposed to be successively engaged by the brush 30 to control the high car call relay H and by the brush 31 for completing stop circuits set up by the call push-buttons in the car for up direction stops. The brush 30 should be long enough to bridge adjacent contact segments.

The contact segments b2 to b6 and the brush 32 connect the circuits of the hall buttons 2U, etc., for up stops. The up contact segments c2 to c7 and the brush 33 connect circuits for cancelling calls registered on the up hall call buttons 2U, etc. The up contact segments d1 to d6 and the brush 34 connect circuits for the high car call relay to be described later. The down cancel contact segments f2, etc., and brush 41; the down floor call contact segments g2, etc., and brush 42; and the down car call contact segments h2, etc., and brush 43 connect circuits for the down direction in the same manner as described for the up direction.

Inasmuch as the present system is, for the sake of simplicity, illustrated for relatively low speed cars of, say, 300 feet per minute having a slowdown distance of less than half a floor height, the brush 42 and the segments g should be so located that the brush will be in the center of the segment for a floor when the car is at that floor and will pick up the segments for a floor when its car is approximately half a floor height away in either direction and thereby give the inductor relay E time to decelerate the car to its stopping speed. When it is desired to apply the invention to higher speed cars, it may be advisable to add an advance brush or brushes such as is old and well known to those skilled in the art, to engage the segments farther in advance of the car.

On the left side of the selector a series of switches e3 and e4 are disposed to be operated by a cam 48 on the carriage 17 for picking up the Service Demand floors as the car goes up. The cam 48 closes the e switch for a floor as it arrives at slowdown position for that floor in the up direction and maintains it closed until the car again approaches the floor in the down direction, when the cam reopens it.

On the right-hand side of the floor selector, a series of switches 52 to 56 are disposed to be operated by a cam 49 on the carriage 17 as it moves from its floor to floor position, for the purpose of controlling a circuit to the high car call relay H.

Figure 3:
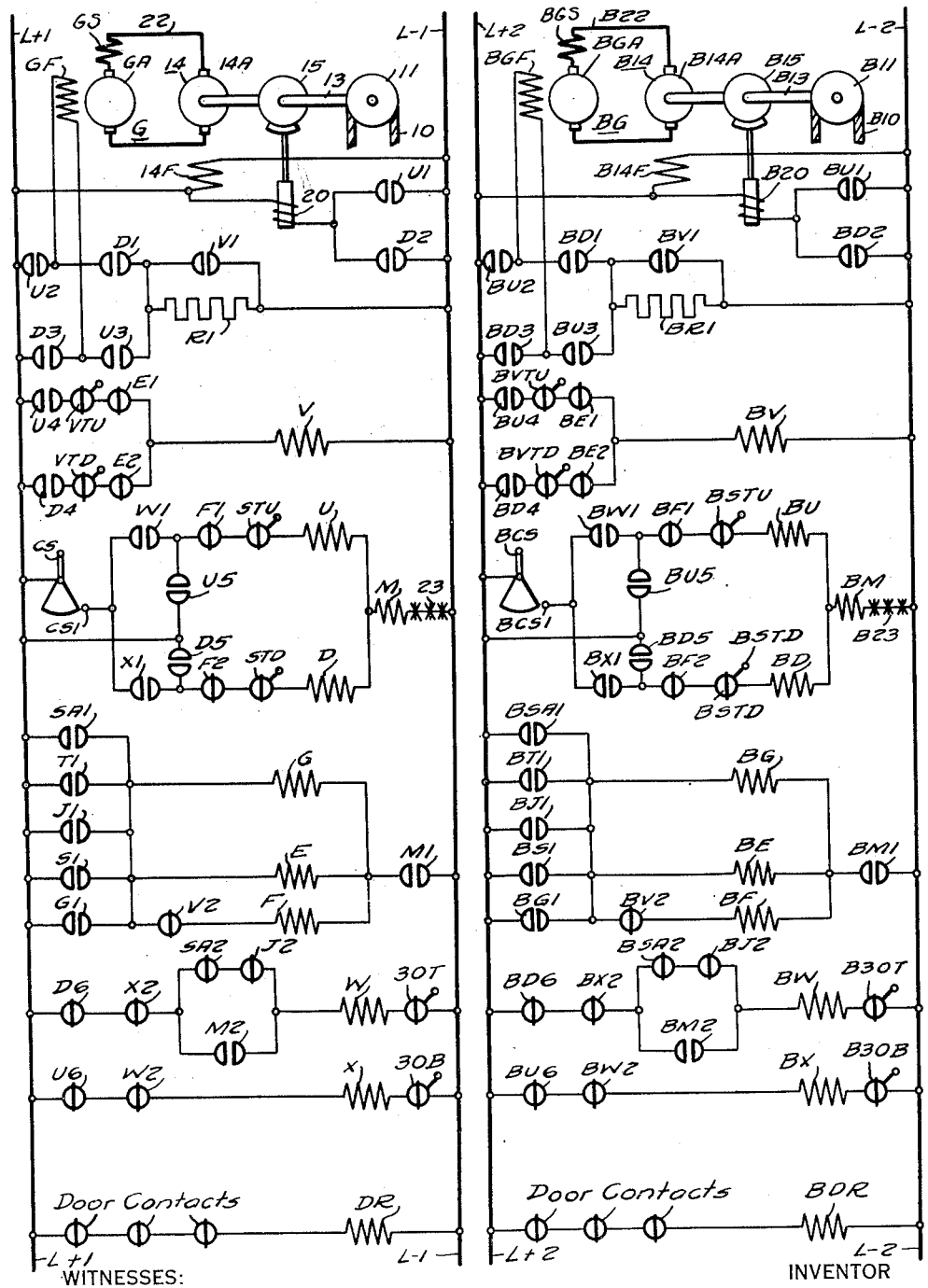
Figure 3A:
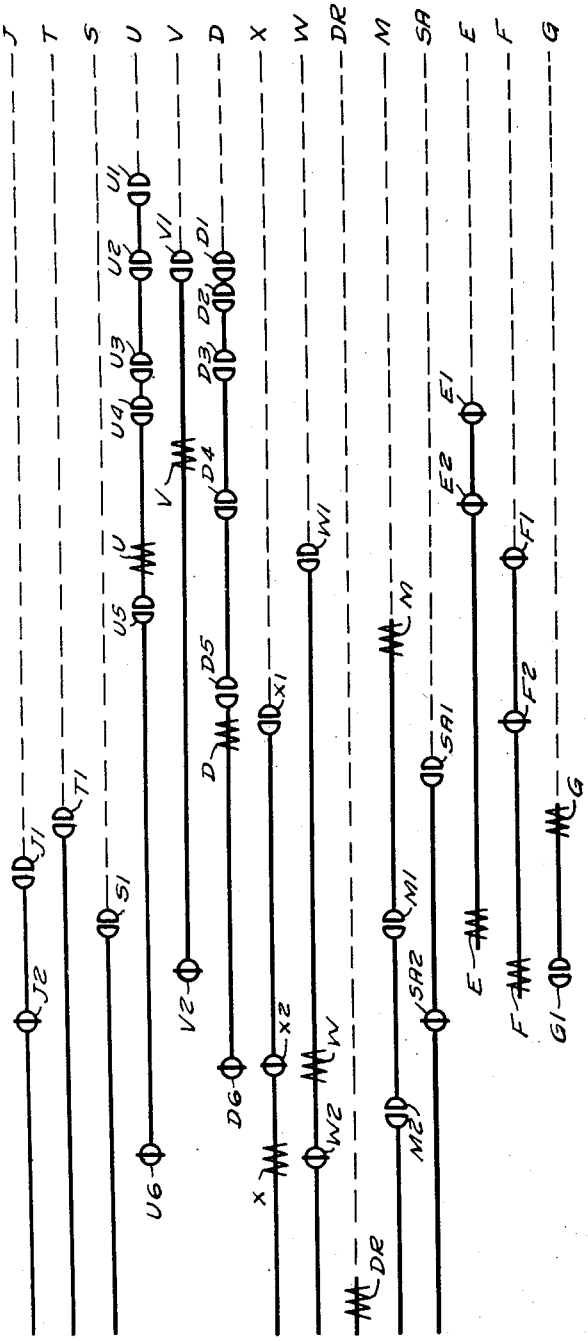

*Apparatus in Fig. 3*

Referring particularly to Fig. 3 of the drawings, the control circuits shown on the left-hand side are individual to car A. At the right-hand side, the circuits are individual to car B.

As shown, the hoisting motor 14 is provided with an armature 14A which is mechanically connected to the shaft 13 for driving the sheave 11. The brake 15 is provided with a winding 20 which is energized on energization of the motor 14. The motor 14 includes the usual shunt-type main field winding 14F, which is connected for energization across the supply conductors L—1 and L+1. The armature 14A is connected for energization by a loop circuit 22 to a generator G which is provided with an armature GA.

In order to control the direction and magnitude of the voltage generated by the generator, it is provided with a separately-excited main field winding GF. A field resistor R1 is included in the circuit of the field winding GF to provide speed control for the motor 14. The generator is also provided with suitable means such as a series field winding GS for correcting the speed regulation of the motor.

The car switch CS located in car A is here shown as electrically connected to selectively control an up direction switch U and a down direction switch D. The switches U and D are provided with contact members for connecting the generator field winding GF to the conductors L+1 and L—1 in accordance with the direction desired. When either the up or the down switch U or D is energized, the car running relay M is also energized to condition certain circuits for operation. The common circuit of the switches U and D and the running relay M includes the usual safety devices indicated at 23.

A high-speed relay V is provided for short-circuiting the resistor R1 to apply the maximum voltage to the generator field winding for operating the car at normal high speed. This relay is controlled by the switches U and D on starting and by the slowdown inductor relay E when starting deceleration for a stop.

The upper and the lower mechanical limit switch VTU and VTD, are provided for interrupting the circuit of the high-speed relay V when the car reaches a proper slowdown point in advance of the upper and lower terminals, respectively, and the upper and the lower stopping limit switch STU and STD are provided for opening the circuits of the switches U and D at the terminal limits, in accordance with the usual practice.

The up direction preference relay W and the down direction preference relay X are provided for controlling the direction of operation of the car and for connecting certain circuits in accordance with the direction. The operating windings of these relays are controlled by a top limit switch 30T, a bottom limit switch 30B, the down Service Demand relay SA or the high-call reversal relay J.

Also, when either the Service Demand relay SA or the high call reversal relay J operates while the car is between terminals, the relays W and X are automatically operated thereby to reverse the direction of the car. Hence the car attendant in operating the car does not need to do anything except to throw the car switch CS over and back to start it and operate the car call buttons for the passengers.

Figure 4:
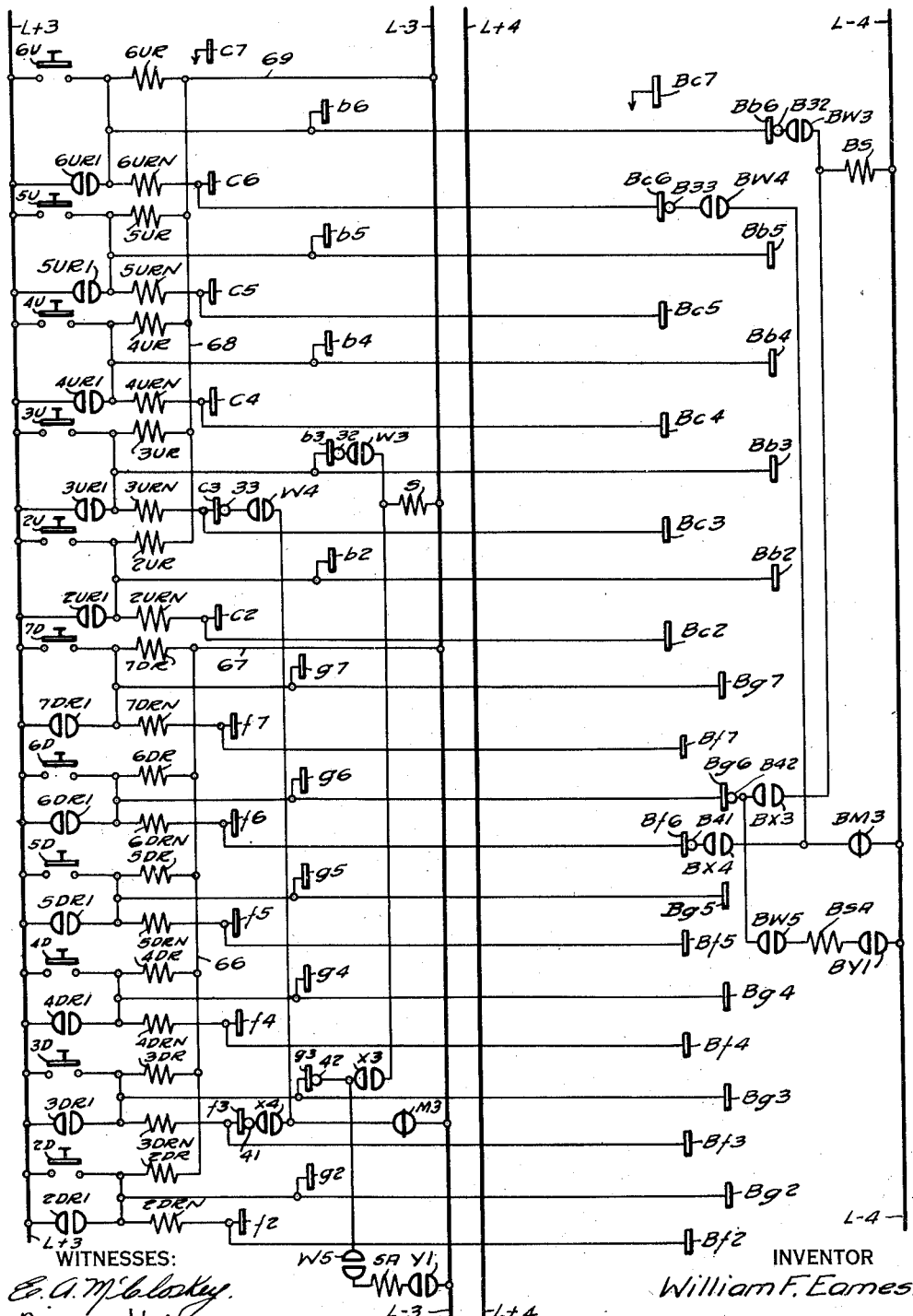
Figure 4A:
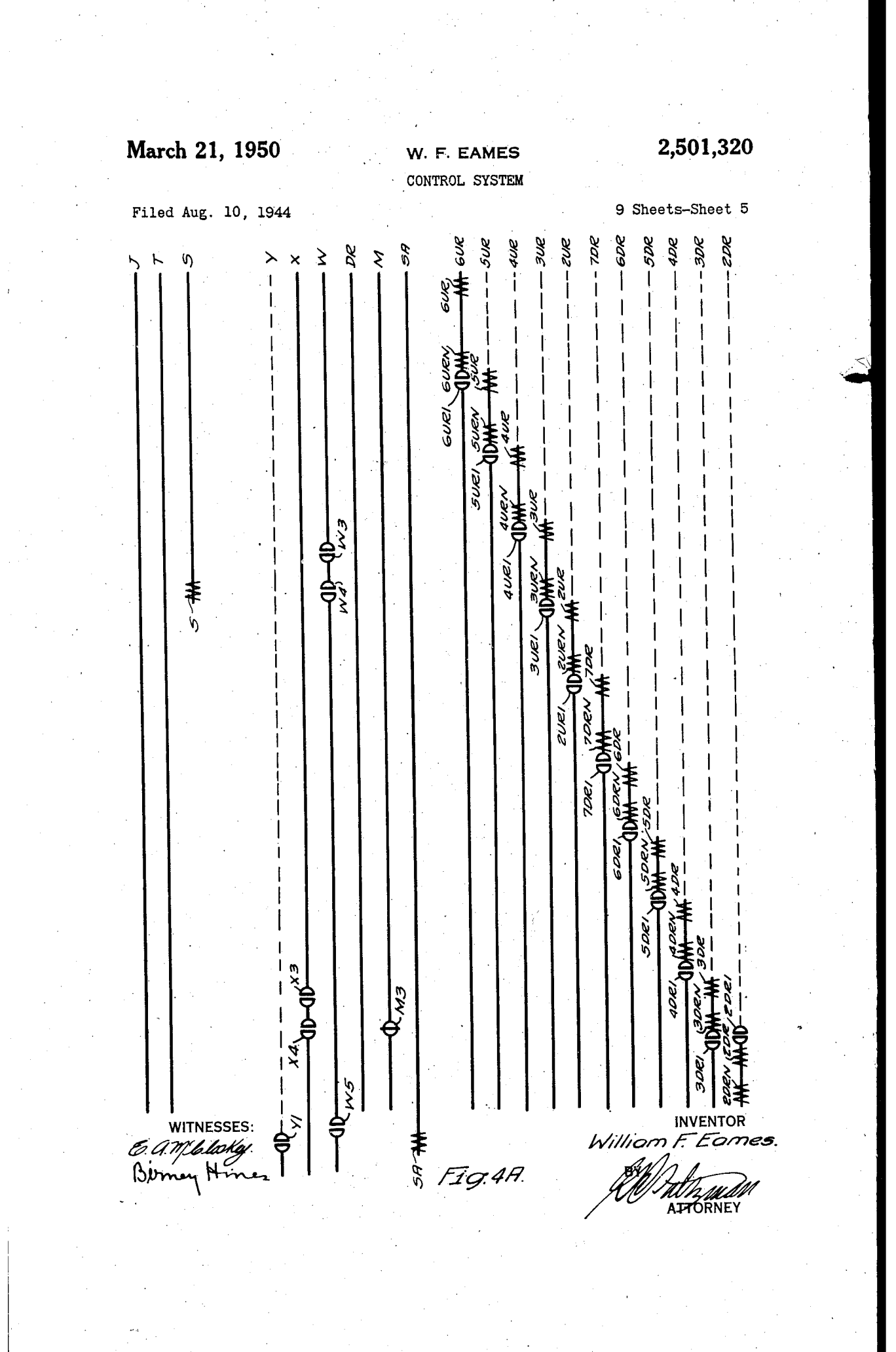

The energizing coils for the slowdown inductor relay E and the stopping inductor relay F, are so connected as to be energized on operation of either the down Service Demand relay SA, the hall call stopping relay S, the car button relay T, or the high call reversing relay J. (The operating coils for relays S and SA are illustrated in Fig. 4, the coil for relay T in Fig. 5, and the coil for relay J in Fig. 6, and they will be described in connection therewith.) An inductor holding relay G is provided for maintaining the inductor relays in energized condition during decelerating and stopping operations.

The door relay DR is controlled by a plurality of door safety contacts and is used for answering the operation of various circuits under safe conditions.

*Apparatus in Fig. 4*

Fig. 4 contains the circuits for the floor buttons 2U, 2D, etc. Associated with each floor button is a call registering or storing relay by means of which the momentary pressing of the button will set up or register a stop call which will remain registered until it is answered by the stopping of a car at that floor for the direction of the call. These relays are designated as 2DR to 7DR for the down direction and as 2UR, 3UR, 4UR, 5UR and 6UR for the up direction.

The down call relays, when energized, close circuits to the row of contact segments g2, etc., and the up relays, when energized, close circuits to the row of contact segments b2, etc., on the floor selector so that the contact segment for a floor for which a call is registered is energized as long as the call exists.

A cancellation coil is wound in opposition to each call registering coil and connected to the cancellation contact segments on the floor selector. The up cancellation coils, designated as 2URN, etc., are connected to the up segments c2, etc., and the down cancellation coils, designated as 2DRN, etc., are connected to the down segments f2, etc. As the brush 33 moves over the segments c2, etc., and the brush 41 moves over the segments f2, etc., they energize the cancellation coil for any floor at which the car stops to answer a stop call.

The car stopping relay S is shown as connected to the up stopping brush 32 engaging segments b3, etc., and the down stopping brush 42 engaging segment g3, etc. When the car approaches a floor in a direction for which a call is registered, its brush for that direction engages the energized contact segment for that floor and that direcsistance in the circuits to the service demand relays.

In the present case, each of the time delay relays has been selected to have a delay of 15 seconds before opening after it has been deenergized, but they may be selected for any other amount of delay desired.

The following resistor values and classes of calls are given in connection with time-delay relays having a delay of 15 seconds as an example of a service demand arrangement which will give satisfactory operation with a demand relay having a resistance of 10 ohms and with a line voltage of 100 volts.

Each of resistors 4R, 3R, 2R=210 ohms
Each of resistors 4R1, 3R1, 2R1=500 ohms
Each of resistors 4R2, 3R2, 2R2=170 ohms
Each of resistors 4R3, 3R3, 2R3=80 ohms Class A=a call of zero through 15 seconds duration=1 unit.
Class B=a call of 15+ through 30 seconds duration=2 units.
Class C=a call of 30+ through 45 seconds duration=3 units.
Class D=a call of over 45 seconds duration=4 units.

Thus, a floor call just after registration and during any period up to the expiration of 15 seconds will represent one unit of demand; if it remains unanswered during any period of from 15+ through 30 seconds, it will represent two units; if it remains unanswered during any period of from 30+ through 45 seconds, it will represent three units, and after it remains unanswered more than 45 seconds, it will represent four units, and the service demand with this arrangement will occur when four or more units develop.

Then the following combinations may occur with the results indicated:

| Calls | Current in Coil DM | Relay DM Response |
|---|---|---|
| | Amperes | |
| One Class A call | .103 | No |
| One Class B call | .213 | No |
| One Class C call | .333 | No |
| One Class D call | .455 | Yes |
| Two Class A calls | .204 | No |
| One Class A one class B | .312 | No |
| One Class A one class C | .426 | Yes |
| Two Class B | .417 | Yes |
| Three Class A | .303 | No |
| Two Class A one class B | .409 | Yes |
| Four Class A | .40 | Yes |

Any other suitable kind of time delay devices may be used if desired such, for example, as the motor driven time delay devices illustrated and described in the Williams et al. Patent No. 2,291,271.

The switches e3, etc., are closed by the cams 48, etc., as the cars go up, and serve to pick up the floors and add their counting resistors to the circuits of the demand relays as the cars move upwardly in the demand zone; that is, they condition the circuits of the demand relays in accordance with the position of the cars.

Cam 48 is long enough to span all the e switches at one time. As the car moves upward the upper end of cam 48 closes each e switch as the car approaches the associated floor. When the car arrives at the uppermost floor of those for which demand service is provided, all the e switches will be closed. Preferably, the cam is made long enough to keep the switches closed after the car passes the demand zone. It may, under some conditions, be desirable to use a short cam with switches which will remain closed as long as the car is above the associated floors. For this purpose, the e switches may be of the type which when actuated remain so until actuated in the reverse direction. Cam 48 for this type of switch becomes an operating lever. My Patent 1,930,514, issued October 17, 1917, illustrates such a selector arrangement.

When a demand device (DM or BDM) is operated, it energizes its conditioning device (Y or BY) which locks itself in and closes the circuit for its demand stopping device (SA or BSA), if the car has no car button call above it. For instance, if car A is an up-moving car, with no car call above it, and its demand relay DM is energized, that relay will energize conditioning relay Y, which will, in turn, energize relay SA to stop the car and reverse it at the last floor where a down call caused relay DM to pick up. If the car has already passed this floor, it will run up to the next floor having a down call before stopping. This avoids a useless stop such as would occur if the car stopped at the next possible floor.

When relay Y operates, it also connects a resistor BR7 in parallel with the demand relay BDM which prevents that relay for car B from becoming energized in the event that car B follows closely behind car A. With this shunt around relay coil BDM a greater demand is required to reverse car B. When car A reaches the bottom floor, switch Lt opens the circuit of the relay Y and a normal demand will then cause car B to reverse.

Each demand relay is also provided with additional shunt resistors (R5 and BR6) to be controlled by another car (not shown) through its conditioning relay contacts such as CY2 and CY3. Thus any car getting a demand call will make it necessary for additional demand calls to be registered before another car can get a demand call. When two cars are in the same condition as to demand calls, only one of them will get the call because, when energized, the relays will race and one of them will close ahead of the other and lock it out. This is a well known action of all relays regardless of the fact that they may be wound with the same number of turns and apparently be exactly alike.

All of the counting resistors may be made of the same value or any one or more of them may differ in value from the others in accordance with the result sought. If it is desired to make a call at a given floor more effective to cause a "demand call," its resistor may be made of less value than the resistors for the other floors.

Furthermore the value of the counting resistors may be varied by the use of manual switches such as the series of manual switches 60, 61, 62 and 63 shown associated with the counting resistors 4R for the fourth floor for use in short-circuiting different sections of the resistor. With these switches, the demand set up by the fourth floor can be weighted to cause special service to this floor, that is, not so many units of demand will be required to operate the relay DM. Car B has similar switches B60, etc., for the fourth floor. Similar switches may be used for any other floor.

A manual switch 65 controlling a resistor BR5 in parallel with the relay coil BDM makes this relay less sensitive to the current through the counting resistors so that the car B must run up past more floors before accumulating sufficient demand to reverse. If this resistor is made low tion and thereby causes the relay S to be energized, which, in turn, energizes the inductor relays E and F of that car to decelerate and stop it at that floor.

Figure 5:
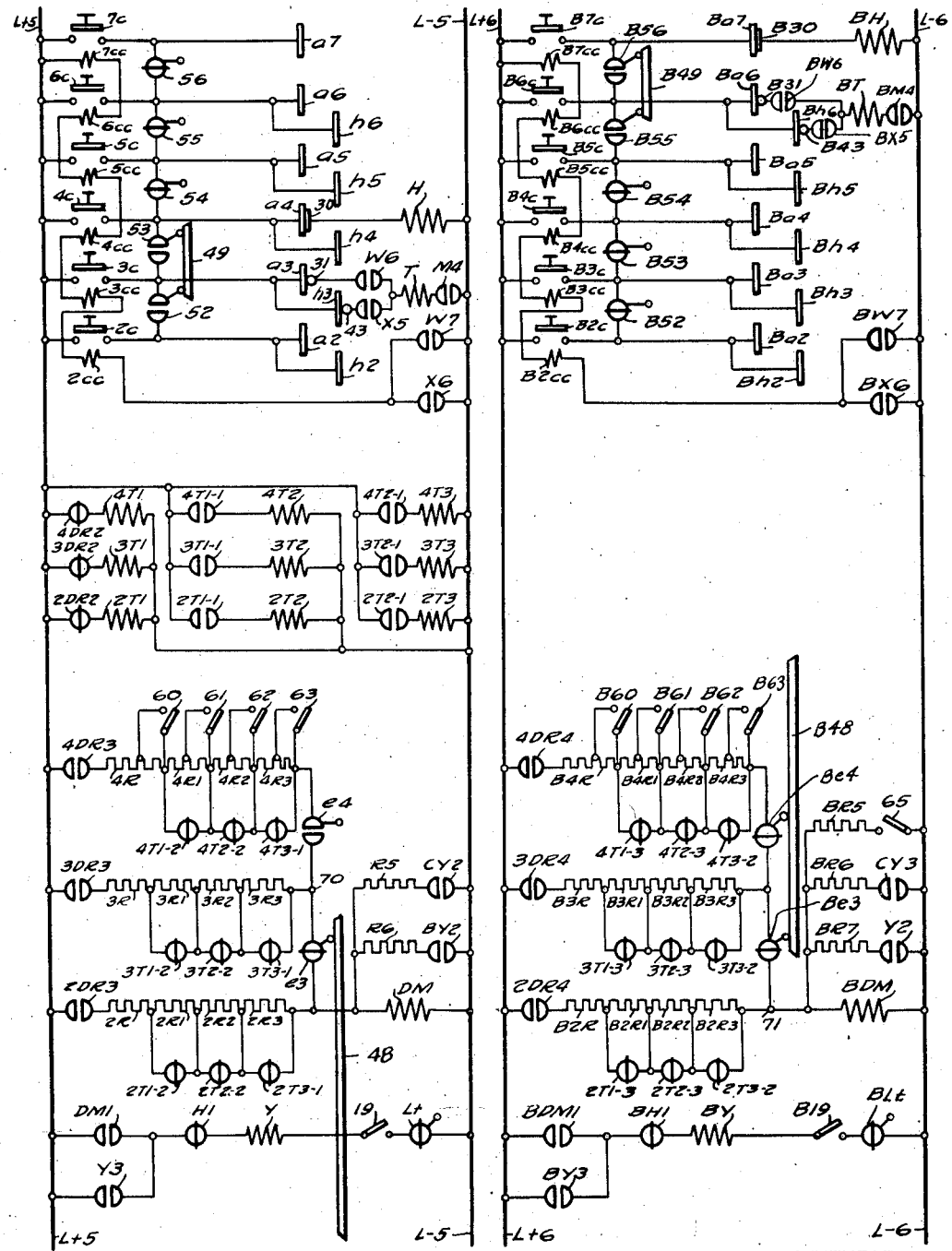
Figure 5A:
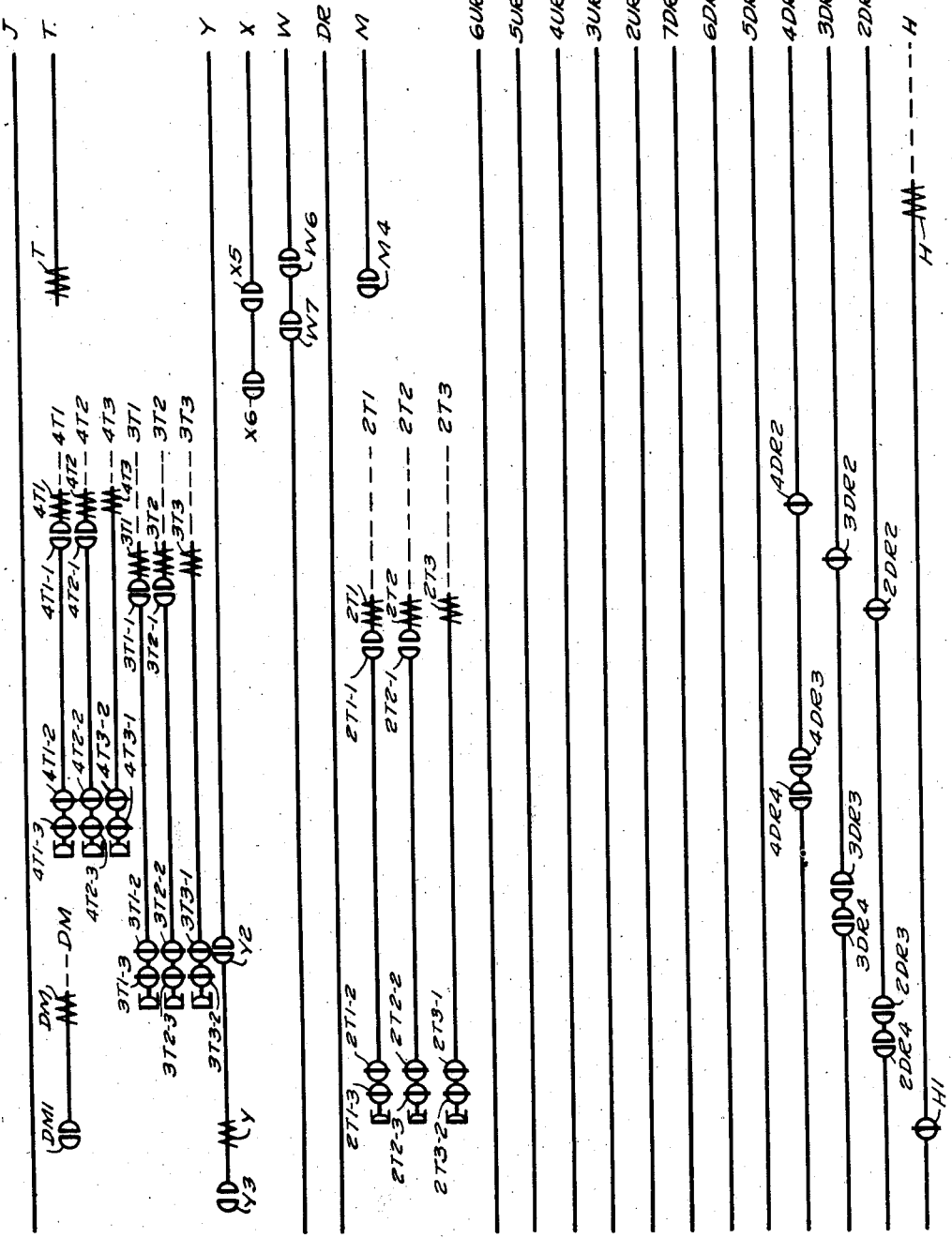

The service demand stopping relay SA is connected to the down stopping brush 42 and is arranged to be controlled by the up direction relay W and the service demand conditioning relay Y. The demand conditioning relay Y is shown in Fig. 5 and will be explained in connection therewith. Briefly, the relay SA is operated as a result of service demand when the car is moving upwardly to stop it and reverse it so that it will answer a down call of long duration. It stops the car by closing its contacts SA1 in the circuit of inductor relay E and it reverses the car after it is stopped by opening its contacts SA2 in the circuit of up direction preference relay W.

Apparatus in Fig. 5

Fig. 5 embodies the car buttons 2c, etc., the high car call relay H, the car call stopping relay T, the service demand relays or demand devices DM and BDM and the time delay relays 4T1, etc., and counting resistors for operating the demand relays, as well as the conditioning relays Y and BY.

The car buttons 2c, etc., are illustrated with their holding coils 2cc, etc., and circuits in the upper part of Fig. 5, in connection with the high car call relay H and the stopping relay T. The coils 2cc, etc., are energized when the car starts in either direction to hold in the car buttons 2c, 3c, etc., as they are operated, until the direction of the car is reversed, so that the temporary operation of a car button by the attendant will cause it to remain in operated condition until the car is reversed.

The high car call relay H is used to prevent the car from being reversed by the high call reversing means as long as it has a stop call on its car buttons for a floor above the car. It is connected by brush 30 to the row of contact segments a2, etc., on the floor selector 16, so that it will be energized whenever a stop call is registered on one of the stop buttons in car A for a floor above the car. The relay H may also be used, where desired to prevent reversal of its car by the service demand means when a call exists above the car.

The switches 52 to 56, inclusive, operated by the cam 49, are so connected in the circuits of the car buttons as to prevent energization of the relay H by operated stop buttons in car A for floors below that car.

The car stopping relay T is connected to the up brush 31 engaging the row of contact segments a2, etc., and to the down brush 43 engaging the row of contact segments b2, etc.; so that, when a call is registered on a car button and the car approaches the energized contact segment corresponding thereto, relay T will be energized to stop the car by energizing the inductor relays E and F.

The down service demand relay DM controls the conditioning relay Y and it in turn controls the demand stopping relay SA illustrated in Fig. 4. Similar relays BDM and BY are provided for car B.

The demand relay DM of car A operates in response to an accumulated demand for service set up by unanswered down calls at floors at and below that car in the demand zone; that is, by the number of unanswered down calls at those floors and the length of time they have remained unanswered. The demand relay BDM of car B is operated in the same manner.

The means for measuring the accumulated service demand for causing operation of the demand relay DM or BDM comprises a plurality of counting resistors 4R etc., for each car and a plurality of cascaded time delay relays, 4T1, etc., common to all the cars. The selector switches, e3, etc., for each car are provided for connecting the counting resistors in accordance with the position of the car.

The counting resistors for car A, one for each floor in the demand zone, are disposed in parallel in a service demand circuit for the demand device DM and are designated as 2R for the second floor, 3R for the third floor and 4R for the fourth floor. The counting resistors for car B are designated as B2R, B3R, and B4R. Each counting resistor is prepared for operation by operation of the down call registering relay for its floor. Furthermore, each resistor is made up of sections which may be short circuited by the time delay relays for its floor as time passes while a stop call remains unanswered; the longer the time, the greater the number of sections short circuited.

The demand relay and the counting resistors for a car should be so selected that current flowing through the full length of one resistor will not be sufficient to operate the relay but current flowing through small portions of three resistors in parallel will operate the relay; or current flowing through the full length of two resistors and a portion of another resistor in parallel will operate the relay; or current flowing through lesser portions of two resistors will operate the relay; or current flowing through only a small portion of one resistor will operate the relay. Obviously the resistance values of the resistors and the winding of the relays should be selected in accordance with the results desired.

In addition, the relay DM is of a type having a drop out point just slightly lower than its pick up point. Thus if .4 ampere is required to move the relay from a deenergized position to an energized position, then a decrease of current to .37 ampere will cause the relay to change from its energized position to its deenergized position.

The cascaded time delay relays for the fourth floor bear the numerals 4T1, 4T2, and 4T3; those for the third floor 3T1, 3T2, and 3T3; and those for the second floor 2T1, 2T2, and 2T3. The time delay relays for each floor remain energized as long as no down call is registered for that floor because when there is no down call at a floor in the demand zone, the normally closed back contacts of the call registering relay for that floor are closed.

When a down hall call is registered at a floor, the down registering relay for that floor opens its back contacts and thereby deenergizes the No. 1 time delay for that floor. After a predetermined delay, that delay relay drops out and closes its back contacts to short circuit sections of the counting resistors for that floor and also deenergizes the No. 2 time delay for that floor. After another predetermined delay, No. 2 delay relay drops out and closes its back contacts to short circuit additional sections of the counting resistors and also deenergizes the No. 3 time delay relay for that floor. After a still further predetermined delay, No. 3 relay drops out and closes its contacts to short further sections of the counting resistors. Hence the longer a call remains unanswered, the less the amount of rein value, the car will reverse at a floor lower than that of the highest call only during exceptionally heavy demand at the lower floors. Thus the circuits for a demand relay at a certain floor or floors may be weighted with respect to length of wait so that they will be less likely to have a longer wait than the adjacent floors. A similar switch may be used in connection with any other car if desired.

I have illustrated time delay relays and call counting resistors for a demand zone including only the second, third, and fourth floors. However, it is to be understood that the demand zone may include any number of floors provided with time delay relays and call counting resistors. For instance, in a building of 30 floors, the lower 12 floors might be provided with time delay relays and call counting resistors so that the cars conditioned for demand service will respond to a predetermined accumulated demand of unanswered down calls in these 12 lower floors. Furthermore the demand zone may be made up of floors for up direction instead of for down direction if desired and it may include a group of floors in the center or at the top of the building by using the requisite time delay relays and counting resistors for the floors to be included in the demand zone.

Figure 6:
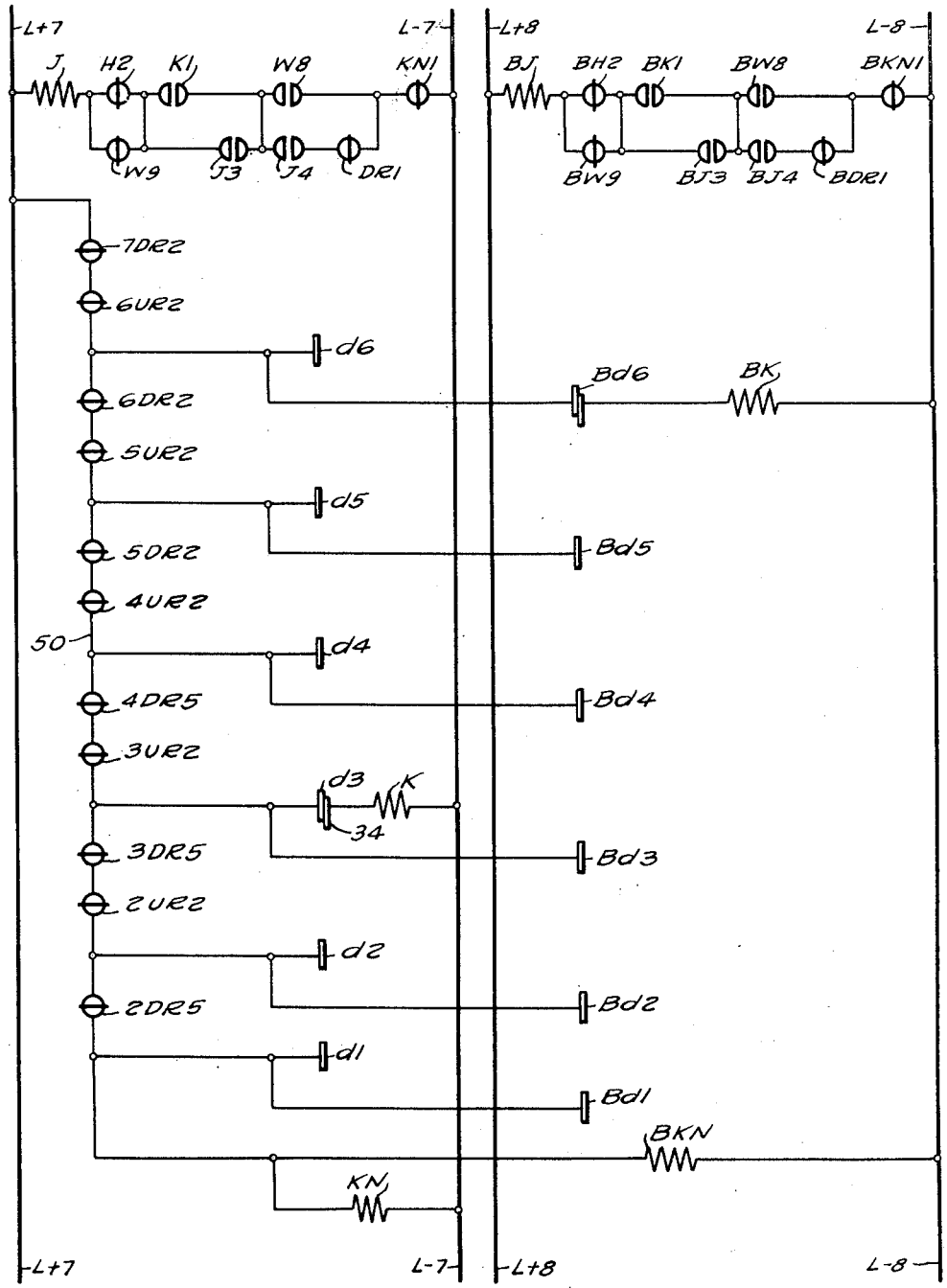
Figure 6A:
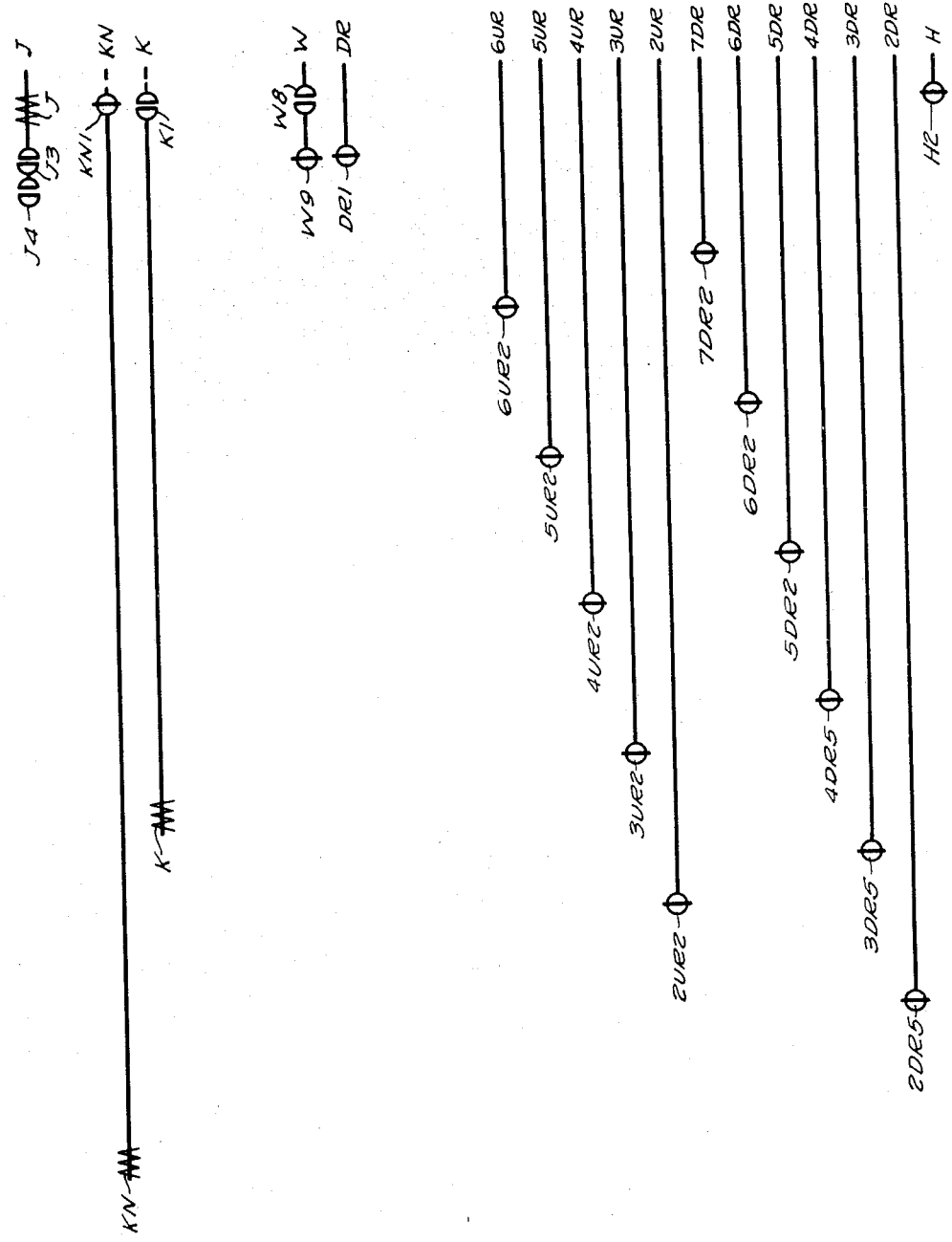

*Apparatus in Fig. 6*

Fig. 6 embodies the high call reversing relay J, the call-above relay K, the no-call relay KN and the operating circuits therefor.

The high call reversing relay J of car A is provided for so preparing the circuits of car A that it will stop and reverse its direction of operation to answer the highest registered down call in the system when there are no up floor calls or car calls above the car. It stops the car by closing its contacts J1 in the circuit of the inductor relays E and F (Fig. 3) and it then reverses the stopped car by opening its contacts J2 in the circuit of the up direction preference relay W (Fig. 3).

The floor call-above relay K of car A is provided for controlling the operation of its high call reversing relay J, in accordance with the existence or non-existence of registered floor calls above the car. This relay is connected to the supply conductor L+7, through the call-above indicator circuit 50, which is common to all the cars.

The circuit 50 includes back contacts of the up and the down call registering relays arranged in series relation according to the natural sequence of the floors and it is connected at floor points with the contact segments d1, d2, etc. Consequently, when car A is travelling upwardly, its relay K will not be energized as long as a call exists at any floor above the floor of the contact segment on which the brush 34 rests, but as soon as the brush reaches a segment with no stored calls above it, a circuit for the relay is completed and it is energized to set the high call reversal relay J in operation.

The no-call relay KN is provided for preventing the car from being reversed by relays K and J at the second floor in the event that there is no call in the system and it is desired to run a car up. This may occur during momentary lulls, in a system where cars are dispatched by a timing dispatcher from the ground floor. If no call is registered relay KN will cause the car to run through to the top terminal, which appears to be useless running. However, this is frequently done in large installations to insure a car being at the top, rather than all cars being bunched at the lower floors. Frequently a down call is registered while the car is moving upward, and the car is then intercepted and will return to the lower floor without making the full trip.

*Operation as high zone car*

The first operation assumed will be that of cars A and B standing at the lower terminal with the doors (not shown) closed and with no stop calls registered. Under these conditions, the door relay DR, the up direction preference relay W, the no floor call relay KN and the high floor call relay K of car A are in energized condition. The door relay DR is energized because all the doors are closed, thus completing the circuit: L+1, door contacts, DR, L—1. The relay W is energized because the bottom terminal switch 30B is open thus deenergizing relay X which closes its back contact X2. The circuit for relay W extends: L+1, D6, X2, SA2, J2, W, 30T, L—1. The relays K and KN are energized by the circuit 50 in Fig. 6 because no stop calls are registered and all the back contacts in circuit 50 are closed.

Both cars A and B are conditioned as service demand zone cars because their switches 19 and B19 are closed.

With the door closed, the car attendant in car A closes the car switch CS temporarily to start the car upwardly and thereby energizes the up direction switch U and the car running relay M through the following circuit:

L+1, CS, CS1, W1, F1, STU, U, M, 23, L—1

The energized relay M closes its contacts M1, M2, and M4 and opens its contacts M3 to prepare the control system of car A for operation.

The energized up direction switch U closes its contacts U1, U2, U3, U4 and U5 and opens its contacts U6 to start the car upwardly. The closing of contacts U1 energizes the brake coil to release the brake 15 (Fig. 3). The closing of contacts U2 and U3 energizes the field winding GF of the generator G by the circuit L+1, U2, GF, U3, R1, L—1. The energization of the field winding GF causes the generator to supply energy to the hoisting motor 14 for operating the drum 11 to move car A upwardly.

The closing of the contacts U4 energizes the high speed relay V by the circuit L+1, U4, VTU, E1, V, L—1. The energized relay V closes its contacts V1 thereby shorting the resistor R1 in the circuit of the generator field winding GF, thus increasing the energization of the field winding to cause the motor 14 to move the car upwardly at its normal high speed.

It will be assumed now that a waiting down passenger at the sixth floor operates the down call button 6D to register a down stop call for that floor. This is above the demand zone and will not affect the timing relays. The operation of button 6D energizes the relay 6DR by the circuit L+3, 6D, 6DR, 66, 67, L—3. The energized relay 6DR closes its contacts 6DR1 in its self-holding circuit. It also supplies energy to the contact segment g6 to stop the next down approaching car. The operated relay 6DR also opens its contacts 6DR2 in the high call circuit 50 thereby deenergizing the high floor call relay K and the no floor call relay KN. The deenergized relay K opens its contacts K1 and the relay KN closes its contacts KN1 in the circuit of the high call reversal relay J.

It will be assumed that car A moves upwardly in the hatchway on its up trip with no call registered above it except the down call at the sixth floor. As it approaches the sixth floor, its brush 34 engages the energized contact segment d6 and thereby energizes the high floor call relay K by the circuit:

$$L+7, 7DR2, 6UR2, d6, 34, K, L-7$$

The energized relay K closes its contacts K1 and thereby energizes the high call reversing relay J by the circuit:

$$L+7, J, H2, K1, W8, KN1, L-7$$

The energized relay J closes its contacts J1 (Fig. 3) thereby energizing the slow-down inductor relay E and the inductor holding relay G to effect the stopping of the car at the sixth floor. The relay G, in turn, closes its contacts G1 to hold the circuit set up by relay J.

As car A approaches closer to the sixth floor, its inductor relay E comes opposite the up plate UEP for that floor and its contacts E1 are opened, thus deenergizing the high speed relay V. The relay V opens its contacts V1 thus inserting the resistor R1 in the circuit of the generator field winding GF and thereby decreasing the speed of the hoisting motor 14 and slowing down the car. The relay V also closes its contacts V2, thus energizing the relay F by L+1, G1, V2, F, M1, L—1.

As the car approaches still closer to the sixth floor, its stopping relay F comes opposite the up stopping plate UFP for that floor which opens its contacts F1, thereby deenergizing the car running relay M and the up direction switch U. The switch U opens its contacts U1 in the brake circuit and its contacts U2 and U3 in the circuit of the generator field winding GF, thus stopping the car and applying the brake to hold it at the sixth floor.

At the same time the contacts J2 of the energized high call reversing relay J are open in one of the parallel circuits of the up direction preference relay W. Therefore, when the contacts M2 of the car running relay M are opened for the sixth floor stop, they open the other parallel circuit for the relay W and thus deenergize it. The deenergized relay W thereupon closes its back contacts W2 which energizes the down preference relay X by the circuit L+1, U6, W2, X, 30B, L—1. The deenergized relay W also opens its contacts W1 in the circuit of the up direction switch U and the down preference relay X closes its contacts X1 in the circuit of the down direction switch D. This reverses the direction of operation for the car to the down direction and when the attendant closes the starting switch CS, the car will start downwardly.

It will be assumed now that the waiting down passenger at the sixth floor enters the car and that the attendant closes the car switch CS thus energizing the down direction switch D and the car running relay M by the circuit L+1, CS, CS1, X1, F2, STD, D, M, 23, L—1. The energized switch D and the relay M cause the car to move downwardly to the first floor where the arrival of the car opens the lower limit switch STD to deenergize the down direction switch D.

Also, as the car reaches the first floor, it opens its bottom terminal switch 30B to deenergize the down preference relay X which, in turn, closes its back contacts X2 to energize the up direction preference relay W to condition the car for up direction operation.

It is seen by the foregoing description how a normal car operates on an up trip to reverse itself at the highest down call when there are no up calls above it to be answered.

*Operation in which a long-unanswered down call stops an up-moving car*

It will be assumed now that both cars are at the lower terminal; and that no calls are registered so that the time delay relays in the demand zone are in energized condition. It will be assumed also that a waiting down passenger at the fourth floor presses the hall button 4D to register a stop call for a down-car at that floor and that the call remains unanswered for a period of, say, more than forty-five seconds which will be long enough to render it a service demand call and to cause the first approaching up-moving car having no calls above it to stop and answer it.

The operation of the fourth floor down button sets up a down stop call at the fourth floor by energizing the call registering relay 4DR by the circuit:

$$L+3, 4D, 4DR, 66, 67, L-3$$

The energized relay 4DR closes its self-holding contacts 4DR1 and its contacts 4DR3 and 4DR4 and opens its contacts 4DR2 and 4DR5. The opened contacts 4DR5 open the call-above circuit 50 thus deenergizing the call-above relays K and BK and also the no-call-above relays KN and BKN of cars A and B. The closed contacts 4DR3 and 4DR4 insert the counting resistors 4R and B4R in the circuits of the demand relays DM for car A and BDM for car B. The opening of the contacts 4DR2 deenergizes the timing relay 4T1 so that it will operate 15 seconds later. At the expiration of 15 seconds, the relay 4T1 opens its contacts 4T1—1 and closes its back contacts 4T1—2 and 4T1—3. The closed contacts 4T1—2 short circuit the resistor section 4R1 in the circuit of the demand relay DM of car A. The closed contacts 4T1—3 short circuit the resistor B4R1 in the circuit of the demand relay BDM of car B. The opening of the contacts 4T1—1 deenergizes the time delay relay 4T2.

After the expiration of another 15 seconds, the relay 4T2 opens its contacts 4T2—1 and closes its contacts 4T2—2 and 4T2—3. The reclosed contacts 4T2—2 short circuit the resistor section 4R2 in a circuit of the demand relay DM of car A. The reclosed contacts 4T2—3 short circuit the resistor B4R2 in the circuit of demand relay BDM of car B. The open contacts 4T2—1 deenergize the time delay relay 4T3.

After the expiration of still another 15 seconds, the relay 4T3 times out and recloses its back contacts 4T3—1 and 4T3—2. The closed contacts 4T3—1 short circuit the resistor section 4R3 in the circuit of the demand relay DM for car A. The closed contacts 4T3—2 short circuit the resistor B4R3 in the circuit of demand relay BDM of car B. The partially completed circuits of both demand relays DM and BDM now embody only short sections of the resistors 4R and B4R associated with the down call registering relay 4DR for the fourth floor.

Inasmuch as the down stop call at the fourth floor has remained unanswered for over forty-five seconds, it has now become a service demand call which will cause an up-moving car to stop, reverse and answer it.

It will be assumed now that an up floor call is registered at the sixth floor by a waiting passenger pressing the up floor button 6U. The closing of the button 6U energizes the up call registering relay 6UR by the circuit:

$$L+3, 6U, 6UR, 69, L-3$$

The energized relay 6UR closes its self-holding contacts 6UR1 and opens its contacts 6UR2 in the call above circuit 50. The registration of this call energizes the stopping contact segments $b6$ of car A and $Bb6$ of car B to stop the nearest approaching up direction car for serving the up waiting passenger at the sixth floor.

By the term "nearest approaching car," I mean that car whose position, direction of operation, and distance from the floor will permit the registered call thereat to stop at that floor when it arrives thereat.

It will be assumed now that the attendant in car A closes the car door and throws the car switch CS to its starting position and then returns it to its off position. The closing of the switch CS energizes the up switch U, as described in connection with the previous up operation of car A, and the car now moves upwardly. As it passes the second floor and approaches the third floor, it closes the switch $e3$, and as it continues up toward the fourth floor, it closes the switch $e4$. The closing of the switches $e3$ and $e4$ completes the circuit through the first section of the resistor 4R to the demand relay DM for car A by the circuit:

$$L+5, 4DR3, 4R, 4T1-2, 4T2-2, 4T3-1, e4, e3, DM, L-5$$

The short section of the resistor 4R in the circuit of the relay DM permits sufficient current to flow through that relay to operate it and it thereupon closes its contacts DM1, thus energizing the conditioning relay Y by the circuit:

$$L+5, DM1, H1, Y, 19, Lt, L-5$$

The energized relay Y closes its contacts Y2 to include the resistor BR7 in parallel with the relay BDM and also closes its contacts Y1 in the circuit of the demand stopping relay SA for car A. The inclusion of the resistor BR7 in parallel with the relay BDM so conditions the demand relay of car B that more service demand calls will be required to operate that relay for stopping car B as it follows car A than were required for stopping car A. Inasmuch as car A is now within stopping distance of the down service demand call at the fourth floor and its brush 42 engages the contact segment $g4$, the demand stopping relay SA will be energized to stop the car A at the fourth floor by the circuit:

$$L+3, 4DR1, g4, 42, W5, SA, Y1, L-3$$

The energized relay SA closes its contacts SA1 and opens its contacts SA2. The opened contacts SA2 open one of the parallel circuits to the up direction preference relay W to prepare it for reversal when the car stops. The closing contacts SA1 energize the decelerating inductor relay E by the circuit:

$$L+1, SA1, E, M1, L-1$$

The holding relay G is disposed in parallel with the inductor relay E and is energized by the same circuit. The energized relay G closes its contacts G1, thus providing a holding circuit for the inductor relays.

As car A passes the up decelerating inductor plate for the fourth floor, the inductor relay E is energized to open its contacts E1 and E2. The opening of these contacts deenergizes the high-speed relay V which opens V1 and closes V2. The contacts V1 insert the resistor R1 in the circuit of the generator field winding GF to reduced speed of the car and it now decelerates to its stopping speed. The contacts V2 energize the stopping inductor relay F by the circuit:

$$L+1, G1, V2, F, M1, L-1$$

As the car A approaches closely to the fourth floor, the up stopping inductor relay F passes the up stopping plate for the fourth floor and is thereby operated to open its contacts F1 and F2, thus deenergizing the up switch U and the car running relay M.

The deenergized up direction switch U and car running relay M release the brake and deenergize the generator and the car stops as previously described. The opening of the contacts M2 in the second parallel circuit to the direction relay W deenergizes that relay which thereupon recloses its back contacts W2 and thereby energizes the down direction preference relay X by the circuit:

$$L+1, U6, W2, X, 30B, L-1$$

When contacts M3 (Fig. 4) close a circuit is established to cancel the 4th floor down call by energizing relay coil 4DRN.

$$L+3, 4DR1, 4DRN, f4, 41, X4, M3, L-3$$

Coil 4DRN opposes coil 4DR and the relay drops to the deenergized position opening the circuits to both coils when contact 4DR1 opens.

When contacts 4DR3 and 4DR4 open, the relays DM and BDM are deenergized and return to their normal condition. However, the relay Y remains energized because of its self-holding contacts until the car returns to the lower terminal and opens the limit switch in the circuit of relay Y. The car will now run in the down direction when it is again started by operation of the car switch CS.

Inasmuch as the car is standing at the fourth floor, the attendant opens the door, the passenger enters, the attendant closes the door and operates the car switch to start the car and it starts in the down direction. If any down calls have been registered in the meantime on the call buttons at the third and second floors, the car will stop for those. As the car continues downward, it approaches the lower terminal and is stopped by the usual limit switches in the usual manner.

This operation illustrates how a down hall call which remains unanswered beyond a predetermined length of time will cause an up running car to stop and answer it, even though an up hall call may be registered above that car. It also illustrates the main feature of my invention in which a hall call will get an answer within a reasonable time from either the cars running in its own direction of operation or from cars running in the opposite direction of operation.

It will be assumed further that car B followed car A closely on its up trip because as car A passed the second floor, the attendant in car B closed his car switch BCS and thus energized his up direction switch BU to move car B upwardly. As car B passes the second and third floors after car A has passed the third floor, it closes its selector switches $Be3$ and $Be4$, but relay BDM is not energized because car A has cancelled the call at the fourth floor. However, the demand relay BDM of car B would not be energized even if the fourth floor call were still in existence because car A has already operated its conditioning relay Y which has closed contacts Y2 inserting the resistor BR7 in shunt relation to relay BDM. Therefore, relay BDM will require a greater number of units of service demand to operate relay BDM to stop and reverse car B than was required to stop and reverse car A. In the absence of this greater demand, car B will continue on up on its up trip and answer the up hall call registered at the sixth floor.

*Operation in which the existence of a car call in an up car prevents that car from answering a down service demand call*

It will be assumed now that both cars are at the lower terminal awaiting an up trip and that an unanswered down call of over 45 seconds has been registered at the fourth floor, as previously described. Under these conditions the resistors 4R and B4R are included in the circuits of the demand relays DM and BDM but their sections 4R1 and B4R1, etc., have been short circuited so that if the floor pick-up switches e3 and e4 for any car are closed, the demand relay for that car will be energized.

It will be assumed now that a passenger enters car B and that the attendant closes the door and presses his car button B6c to register a car call for the passenger to get off at the sixth floor. The pressing of the button B6c energizes the contact segment Ba6 of car B to stop it when it arrives at the sixth floor. The button will remain in its pressed position because of the energization of its holding coil B6cc by the circuit extending from conductor L+6 through the holding coils for the B car buttons and the contacts BW1 to the conductor L—6. Inasmuch as car B is standing at the lower floor, its selector cam B49 does not engage any of the switches B52 to B56, and its brush B30 engages the contact segment Ba2, thus energizing its car call-above relay BH by a circuit extending L+6, B6c, B55, B54, B53, B52, Ba2, B30, BH, L—6

The energized relay BH opens its contacts BH2, thus preventing energization of the high call reverse relay BJ for car B, and also opens its contacts BH1 in the circuit of the demand conditioning relay BY of car B to prevent it from answering the down service demand call at the fourth floor on its up trip.

It will be assumed now that the attendant in car B closes the car switch BCS thereby closing the contacts BCS1 and thus energizing the relays BU and BM for up-direction operation by the circuit.

L+2, BCS1, BW1, BF1, BSTU, BU, BM, L—2

The energized up-direction switch BU closes its contacts BU1 to release the brake and close its contacts BU2 and BU3 to energize the generator field winding BGF to start the car upwardly in the same manner as the car A was operated upwardly in the previously described operation.

As car B moves upwardly, it closes the switch Be3 between the second and third floor counting resistors and then closes the switch Be4 between the counting resistors for the third and fourth floor. The closing of these switches completes the circuit for energizing the demand relay BDM of car B as follows:

L+6, 4DR4, B4R, 4T1—3, 4T2—3, 4T3—2, Be4, Be3, BDM, L—6

The energized relay BDM closes its contacts BDM1 in the circuit of relay BY but that relay does not become energized, because the contacts BH1 are open. Therefore, the operation of relay BDM does not cause car B to stop for the demand call at the fourth floor because the car B has a car call above which it must serve instead of answering the service demand. Car B now continues its up trip and as its brush B31 engages the contact Ba6 for the sixth floor, its stopping relay BT is energized to stop the car at that floor.

If now car A without any car call registered follows car B, it will pick up and answer the down service demand call at the fourth floor in the manner previously described.

This assumed operation illustrates why an up moving car with a passenger for a higher floor will not stop and reverse to answer a service demand call.

*Operation where two down calls in demand zone totalling over four units of demand, reverse an up-moving car*

It will be assumed now that both cars are again at the lower terminal ready for up operation, that a waiting passenger at the fourth floor presses the down-hall button 4D to register a down call at that floor, and that 15 seconds later a down passenger at the third floor presses the down-hall button 3D to register a down call at that floor. It will also be assumed that a waiting down passenger at the sixth floor presses the down button 6D to register a down-stop call at that floor.

The pressing of the down button 4D at the fourth floor energizes the down direction relay 4DR and, as previously described, that relay thereupon closes its contacts 4DR2 and 4DR3 to insert the resistor 4R and the resistor B4R in the circuits of the relays DM and BDM. Also its open contacts 4DR2 deenergize the time delay relay 4T1, so that it starts timing out, as previously described. At the end of 15 seconds, the time delay relay 4T1 opens, thus closing its contacts 4T1—2 to short-circuit the resistor section 4R1 and closing its contacts 4T1—3 to short-circuit the resistor section B4R1. It also opens its contacts 4T1—1 thereby deenergizing the time delay relay 4T2 to start the timing out.

Also at the end of this 15 second period a down call at the third floor is registered and the relay 3DR is energized by the circuit:

L+3, 3D, 3DR, 66, 67, L—3

The energized relay 3DR closes its self-holding contacts 3DR1, opens its contacts 3DR2 and 3DR5 and closes its contacts 3DR3 and 3DR4. The closing of the contacts 3DR3 and 3DR4 insert the resistor 3R and B3R in the circuits of the relay DM and BDM. The opening of the contacts 3DR2 deenergizes the time delay relay 3T1 and it starts timing out.

It will be assumed now that the attendant in car A closes the car switch CS and starts his car upwardly as previously described. As the car moves upwardly, it closes its selector switches e3 and e4, thereby connecting the resistors 3R and 4R in parallel through the relay DM for car A. However, sufficient current will not flow through the resistors to energize the relay DM at this time, because the full resistor 3R is in the circuit and all of resistor 4R except the section 4R1 is disposed in the circuit.

It will be assumed now that, after car A passes the fourth floor, a second 15 second period expires thus causing relay 4T2 to time out and also relay 3T1 to time out. The deenergized relay 4T2 recloses its back contacts 4T2—2 thus short-circuiting the resistor section 4R2 and the deenergized relay 3T1 closes its back contacts 3T1—2, thus short-circuiting the resistor section 3R1. The shorting of these resistor sections now permits sufficient current to flow through the sections of the parallel resistors 4R and 3R now in the circuit to energize the relay DM. This circuit extends from L+5, through 4DR3, 4R, 4T1—2, 4T2—2, 4R3, e4 to a junction point 70, and from L+5 in parallel through 3DR3, 3R, 3T1—2, 3R2, 3R3 to the junction point 70; and thence through e3, DM, L—5.

The energized relay DM closes its contacts DM1, thereby energizing the conditioning relay Y which in turn closes its contacts Y1 in the circuit of the stopping relay SA of car A. However, inasmuch as car A has passed the stopping point for the fourth floor, it cannot now stop at that floor and will therefore go on to the next registered down call before stopping and reversing in response to the service demand.

It will be assumed that car A now continues upwardly and as it approaches the sixth floor its brush 42 engages the energized contact segment g6 and thereby energizes the demand stop relay SA by the circuit:

L+3, 6DR1, g6, 42, W5, SA, Y1, L—3

The energized relay SA closes its contacts SA1 and opens its contacts SA2. The contacts SA1 energize the decelerating inductor relay E, as previously described, and the open contacts SA2 open one of the parallel circuits to the direction preference relay W, so that when the car stops, it will be reversed.

As the car approaches closer to the sixth floor the inductor relay E comes opposite the up inductor plate UE for that floor, and is thereby influenced to open its contacts E1 and E2, thereby deenergizing the high-speed relay V to reduce the speed of the car. As the car comes still closer to the sixth floor, the stopping inductor relay F comes opposite its plate for that floor and is operated to open its contacts F1 and F2, thereby deenergizing the up direction switch U and the car running relay M of car A. The deenergized switch U deenergizes the hoisting motor and applies the brake to stop the car and the car stops at the sixth floor. The deenergized relay M now opens its contacts M2 in the second parallel circuit of the relay W, thus deenergizing that relay, which, in turn, closes its back contacts W2, thereby energizing the down direction relay X for car A which will cause that car to move downwardly when the car switch is again closed to start the car.

When the car stopped and reversed at the sixth floor, the closing of the contacts X4 and M3 energized the call cancelling coil 6DRN by the circuit:

L+3, 6DR1, 6DRN, f6, 41, X4, M3, L—3

The energized coil 6DRN cancels the down call at the sixth floor.

It will be assumed now that the waiting passenger at the sixth floor enters the car A and the car attendant closes the car switch CS and thus starts the car downwardly.

When the up direction preference relay W was deenergized to reverse the car, it opened its contacts W5 in the circuit of the stopping relay SA thus returning that relay to its normal condition. Now as the car continues on down, it will answer the demand calls at the fourth floor and the third floor in the usual manner and also any down call at the second floor.

As car A moves downwardly to the fourth floor, its brush 42 engages the contact segment g4 and thereby energizes its stopping relay S to stop it at the fourth floor by the circuit:

L+3, 4DR1, g4, 42, X3, S, L—3

The energized relay S closes its contacts S1 in the circuit of the decelerating inductor relay E, and as the car approaches closer to the fourth floor, the inductor relay E comes opposite its time decelerating inductor plate and is operated thereby to open its contacts E1 and E2 thus deenergizing the high-speed relay V to decelerate the car. The relay V opens its contacts V1 and closes its back contacts V2. The opened contacts V1 insert the resistor R1 in the series with the generator field winding to decelerate the car, and the closed contacts V2 energize the stopping inductor relay F. As the car comes still closer to the fourth floor, the inductor relay F passes the down stopping inductor plate for that floor and operates to open its contacts F1 and F2 thus deenergizing the down direction switch D and the car running relay M, and the car stops at the fourth floor.

Assuming now that the down passengers at the fourth floor enters the car and that the attendant closes the car switch CS, the car again starts down and as it approaches the third floor its stopping brush 42 engages the contact segment g3, thereby energizing the stopping relay S through the circuit:

L+3, 3DR1, g3, 42, X3, S, L—3

The stopping relay S again energizes the decelerating relay E which decelerates the car and energizes the stopping inductor relay F, which, in turn, stops the car as it arrives at the third floor. After the waiting down passenger at the third floor enters, the car attendant closes the car switch CS and again starts the car downwardly and it moves into and stops at the lower terminal by the usual limit switch.

This assumed operation illustrates how a plurality of down calls in the demand zone which remain unanswered for different lengths of time may total up to such a predetermined service demand as to cause an up-moving car to stop, reverse and answer them even though it may have passed their floors.

*Operation in which a car responds to service demand only under extreme conditions of demand*

In order to prevent the lower floors from monopolizing the elevator service under extreme conditions, one or more of the cars should be rendered non-responsive to demand by opening their conditioning switches 19. However, in some cases, it may be more desirable to condition one or more of the cars so that it will not respond to service demand unless demand calls in the demand zone remain unanswered for an exceptionally long time or there are an exceptionally large number of unanswered calls.

It will be assumed now that the manual switch 65 for car B is closed to change the conditions under which that car will answer service demand to such an extent that at least eight units of service demand must be in existence to cause car B to respond to a service demand. The closing of the switch 65 effects this because it inserts the resistor BR5 in parallel with the demand relay BDM of car B.

It will be assumed now that car A is at the upper terminal serving the upper floors; that car B is at the lower floor ready for an up trip; and that down stop calls are registered at the fourth, the third, and the second floors. It will be assumed further that the call at the fourth floor has remained unanswered for 15 seconds; that the call at the third floor has remained unanswered for 15 seconds; and that the call at the second floor has remained unanswered for 45 seconds. The down call at the fourth floor remaining unanswered for 15 seconds conditions the resistor 4R, as previously described, so that section 4R1 of the resistor is short-circuited in the circuit for the relay DM.

The registration of the down call at the third floor has operated the call registering relay 3DR3 as previously described, and inasmuch as 15 seconds have passed, the contacts 3T1—2 are closed, thereby short-circuiting the resistor section 3R1.

The pressing of the down button 2D at the second floor energizes the down call registering relay 2DR by the circuit L+3, 2D, 2DR, 66, 67, L—3. The energized relay 2DR closes its self-holding contacts 2DR1 and contacts 2DR3 and 2DR4 and opens its contacts 2DR2. The closing of the contacts 2DR3 and 2DR4 inserts the resistors 2R and B2R in the circuits of the relays DM and BDM. The opening of the contacts 2DR2 denergizes the timing relay 2T1, and after the expiration of 15 seconds it times out, thus reclosing its contacts 2T1—2 to short-circuit the resistor section 2R1 and closing its contacts 2T1—3 to short-circuit the resistor B2R1. Relay 2T1 also opens its contacts 2T1—1 thus deenergizing relay 2T2. After 15 seconds 2T2 opens 2T2—1 to deenergize relay 2T3 and closes 2T2—2 and 2T2—3 to short-circuit sections 2R2 and B2R2 in resistors 2R and B2R. After a third 15 seconds, the relay 2T3 times out, closing its contacts 2T3—1 and 2T3—2 thus short-circuiting the sections 2R3 and B2R3 in the resistors 2R and B2R. Assuming that the attendant in car B closes the car switch BCS and thus starts that car upwardly, as it approaches the second floor a circuit exists for its demand relay BDM as follows:

L+6, 2DR4, B2R, 2T1—3, 2T2—3, 2T3—2 to the point 71 and thence in parallel through BR5 and 65 to L—6 and BDM to L—6.

The call at the second floor is 45 seconds old, a condition which would normally stop car B, but inasmuch as the switch 65 is closed the circuit does not pass enough current through relay BDM to cause its operation.

As car B passes the second and approaches the third floor it closes the pick-up switch Be3, thus including the resistors B3R with its short-circuited section B2R1 in parallel with the resistor B2R. This permits the flow of additional current through the resistor BR5 and relay BDM, but not sufficient current to operate the relay BDM, because it still has the equivalent of only six units of service demand.

As car B passes the third floor it closes its pick-up switch Be4, thus including the resistor B4R with its short-circuited section B4R1 in parallel with the resistors B2R and B3R. This permits the flow of additional current so that the value of the current now flowing through the relay BDM is sufficient to operate that relay and it closes its contacts BDM1, thus energizing the conditioning relay BY. The energized relay BY closes its contacts BY1, thereby energizing the demand stopping relay BSA of car B by the circuit:

L+3, 4DR1, Bg4, B42, BW5, BSA, BY1, L—3

This happens because car B is at the stopping point for the fourth floor. The energized relay BSA closes its contacts BSA1, thereby energizing the decelerating inductor relay BE. The relay BSA also opens its contacts BSA2 in the parallel circuit for the direction preference relay BW of car B, so that it will reverse when it stops.

As car B approaches closer to the fourth floor, its inductor relay E comes opposite its inductor plate and is operated to open its contacts BE1 and BE2, thus deenergizing the high speed relay BV which decelerates the car and also closes its back contacts BV1, thus energizing the stopping relay BF. As the car approaches still closer to the fourth floor, the inductor relay BF comes opposite the stopping plate and is thereby influenced to open its contacts BF1 and BF2, thus deenergizing the up switch BU and the car conditioning relay BM. Thereupon the relay BM opens its contacts BM2 and thus deenergizes the up direction preference relay BW so that it closes its back contacts BW2 and thereby energizes the down direction preference relay BX. Car B is now reversed and after leaving the fourth floor it will stop at the third floor and the second floor to collect those calls and then run on down to the lower terminal.

This assumed operation illustrates how a car may be conditioned as an "extremist" car which will not reverse on the occurrence of the normal service demand, but will stop and reverse in answer to a service demand greater than that required to reverse the other cars, as it will be recalled that this operation used a predetermined number of eight demand units instead of four demand units.

*Operation in which a floor is so conditioned that its unanswered calls will be answered more quickly than the unanswered calls at other floors*

At times it may be desirable to so arrange the service demand apparatus that down stop calls at a certain floor will be answered, if delayed, more quickly than the other floors or at least the one floor will have a more controlling effect than the other floors. In order to cause the cars to be more sensitive to the unanswered condition of registered down calls at the 4th floor than the other floors, I have provided a series of manual switches 60, 61, 62, and 63 for decreasing the size of the resistor sections making up the resistor 4R. It will be assumed now that these switches are all closed, and that a down call is registered at the fourth floor, as previously described. It will be assumed also that this down call remains unanswered for a period of 30 seconds. During this time, the timing relays 4T1 and 4T2 have timed out and closed their contacts 4T1—2 and 4T2—2 to short-circuit the resistor sections 4R1 and 4R2. The closing of the switches 60 and 63 shorten the resistor sections 4R and 4R3. Hence, when car A moves up (assuming that it does), and closes the switches e3 and e4, the demand relay DM will be energized at the end of 30 seconds by the circuit:

L+5, 4DR3, 4R, 60, 4T1—2, 4T2—2, 4R3, 63 e4, e3, DM, L—5.

The energized relay DM closes its contacts DM1, thereby energizing the conditioning relay Y, which in turn, closes its contacts Y1 in the circuit of the demand stopping relay SA for car A, and that car is then stopped and reversed at the fourth floor to answer the down demand call thereafter, as previously described.

From this operation it will be obvious that one or more floors may be rendered more effective to cause a service demand action thereat so that cars conditioned for operation in response to service demand will operate more quickly to stop thereat; that is, these floors will have such a set-up that cars will respond to even a relatively small service demand thereat; also, the "sensitive" floors will have a greater influence on the demand relays than the other floors when down calls are registered at several floors in the demand zone.

By the foregoing assumed operations, it will be seen that I have provided a flexible control system which will prevent the cars in an elevator bank from becoming bunched in the upper floors and which will also cause certain cars to leave their usual routine and answer certain calls in case they remain unanswered for an unusual length of time.

Although I have illustrated only one system embodying my invention, it will be obvious that many changes therein and modifications thereof may be made without departing from the spirit and scope of the invention.

I claim as my invention:

1. An elevator system comprising a plurality of cars for serving a plurality of floors including an upper normal zone and a lower demand zone, an operating means for each car, an up call device and a down call device for each of the intermediate floors for causing the operating means of the cars to stop them thereat when they are in condition to make such stops, a demand device for each car, a measuring means operably responsive upon upward operation of a car to a predetermined service demand resulting from a combination of the number of down call devices in operated condition in the demand zone and the length of time each of said down call devices has been in that condition for operating the demand device of that car, and means responsive to operation of the demand device of a car and operable during up movement thereof for operating the stopping and reversing means of that car at the highest down call which caused the operation of the reversing means or at the next down call above it.

2. An elevator system comprising a plurality of cars for serving a plurality of floors, stopping means for each car, a reversing means for each car, an up call device and a down call device for each floor for causing the operating means of the cars to stop them thereat when they are in condition to make such stops, a demand zone comprising a plurality of selected call devices for one direction, means for measuring the accumulated total demand for service in the demand zone, said measuring means being connected with the call devices for the floors and for the direction selected as the demand zone, and a demand means associated with each car and operable by the measuring means upon the occurrence of a predetermined value of said total demand for service during movement of that car in a direction opposite to the direction of the service demand calls in the demand zone for operating the stopping and reversing means of that car for answering the service demand calls.

3. An elevator system comprising a plurality of cars for serving a plurality of floors divided into a normal zone and a multifloor demand zone, a stopping means for each car, a reversing means for each car, an up call device and a down call device for each floor for causing the stopping means of the cars to stop them thereat when they are in condition to make such stops, means for measuring the accumulated total demand for service in the demand zone, said measuring means being connected with the call devices for the floors and for the direction selected as the demand zone, a demand device associated with each car and operable by the measuring means, a demand stopping and reversing means for each car, and a conditioning means for each car responsive to operation of the demand device of that car and operable during movement thereof in a direction opposite to the direction of the service demand calls in the demand zone for causing its demand stopping and reversing means to operate its stopping means and its reversing means.

4. An elevator system comprising a plurality of cars for serving a plurality of floors divided into a normal zone and a multifloor demand zone, a stopping means for each car, a reversing means for each car, car call devices in each car for registering car calls, an up call device and a down call device for each floor for causing the stopping means of the cars to stop them thereat when they are in condition to make such stops, means for measuring the accumulated total demand for service in the demand zone, said measuring means being connected with the call devices for the floors and for the direction selected as the demand zone, a demand device associated with each car and operable by the measuring means, a demand stopping and reversing means for each car, a conditioning means for each car responsive to operation of the demand device of that car and operable during movement thereof in a direction opposite to the direction of the service demand calls in the demand zone for operating its stopping means and its reversing means, and means responsive to operation of the car call means of a car for a floor above it for preventing operation of the conditioning means of that car.

5. An elevator system comprising a plurality of cars for serving a plurality of floors divided into a normal zone and a multifloor demand zone, a stopping means for each car, an up call device and a down call device for each floor for causing the stopping means of the cars to stop them thereat when they are in condition to make such stops, means for measuring the accumulated total demand for service in the demand zone, said measuring means being connected with the down call devices for the floors selected as the demand zone, a demand device associated with each car and operable by the measuring means upon the occurrence of a predetermined service demand, and a conditioning means for each car responsive to operation of the demand device of that car and operable during up movement thereof for causing it to stop and reverse at the last floor where a down call caused the demand device to be operated or at the next floor having a down call.

6. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and pick-up switches, and means responsive to operation of a demand device for operating the stopping means and the reversing means of the car associated with that demand device so that it may answer down stop calls below it.

7. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, connected for control by the call devices for the direction and for the floors included in the demand zone, a plurality of counting resistors, one for each car for each floor in the demand zone, for controlling the flow of energy through the demand circuit, a timing device associated with each call device included in the demand zone, means responsive to operation of a demand zone call device for a demand zone floor for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by movement of that car in a direction opposite to the direction of the demand zone call devices to sequentially connect the counting resistors of that car in parallel in the service demand circuit, a demand device disposed in the demand circuit of each car and operable by a predetermined flow of energy therein resulting from operation of the demand zone call devices, the timing devices and the pick-up switches, a conditioning means for each car responsive to operation of its demand device for operating the stopping means and the reversing means of that car so that it may answer stop calls behind it in a direction opposite to its initial direction, and means responsive to operation of the conditioning means of one car for changing the circuits of the other demand devices so that a larger service demand will be necessary to operate such devices.

8. An elevator system comprising a plurality of cars for serving a plurality of floors divided into a normal zone and a demand zone, a stopping means for each car, a reversing means for each car, car call devices in each car for registering car calls, an up call device and a down call device for each floor for causing the stopping means of the cars to stop them thereat when they are in condition to make such stops, a service demand circuit for each car, connected for control by the call devices for the direction and for the floors included in the demand zone, a plurality of counting resistors, one for each car for each floor in the demand zone, for controlling the flow of energy through the demand circuit, a timing device associated with each call device included in the demand zone, means responsive to operation of a demand zone call device for a demand zone floor for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by movement of that car in a direction opposite to the direction of the demand zone call devices to sequentially connect the counting resistors of that car in parallel in the service demand circuit, a demand device disposed in the demand circuit of each car and operable by a predetermined flow of energy therein resulting from operation of the demand zone call devices, the timing devices and the pick-up switches, a conditioning means for each car responsive to operation of its demand device for operating the stopping means and the reversing means of that car so that it may answer stop calls behind it in a direction opposite to its initial direction, and means responsive to registration of a car call for a floor above a car for preventing operation of its conditioning means to stop and reverse it.

9. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, connected for control by the call devices for the direction and for the floors included in the demand zone, and which define the demand zone, a plurality of counting resistors, one for each car for each floor in the demand zone, for controlling the flow of energy through the demand circuit, a timing device associated with each call device included in the demand zone, means responsive to operation of a demand zone call device for a demand zone floor for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by movement of that car in a direction opposite to the direction of the demand zone call devices to sequentially connect the counting resistors of that car in parallel in the service demand circuit, a demand device disposed in the demand circuit of each car and operable by a predetermined flow of energy therein resulting from operation of the demand zone call devices, the timing devices and the pick-up switches, and means responsive to operation of a demand device for operating the stopping means and the reversing means of the car associated with that demand device so that it may answer stop calls behind it in a direction opposite to its initial direction.

10. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and pick-up switches, and a conditioning means for each car responsive to operation of its demand device for operating the stopping means and the reversing means of that car so that it may answer down stop calls below it, and means responsive to operation of the conditioning means of one car for changing the circuits of the other demand devices so that a larger service demand will be necessary to operate such devices.

11. An elevator system comprising a plurality of cars for serving a plurality of floors divided into a normal zone and a demand zone, a stopping means, a reversing means for each car, car call devices in each car for registering car calls, an up hall call device and a down hall call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and pick-up switches, a conditioning means for each car responsive to operation of its demand device for operating the stopping means and the reversing means of that car so that it may answer down stop calls below it, and means responsive to registration of a car call for a floor above a car for preventing operation of its conditioning means to stop and reverse it.

12. An elevator system comprising a plurality of cars for serving a plurality of floors divided into a normal zone and a demand zone, a stopping means, a reversing means for each car, an up call device and a down call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and the pick-up switches, means responsive to operation of a demand device for operating the stopping means and the reversing means of the car associated with that demand device so that it may answer down stop calls below it, and manually controllable means for changing the responsiveness of the demand device of one of the cars to the service demand set up in the demand zone.

13. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and the pick-up switches, means responsive to operation of a demand device for operating the stopping means and the reversing means of the car associated with that demand device so that it may answer down stop calls below it, and manual means for varying the value of the counting resistors for a floor to change their effect on the circuits of the service demand devices.

14. An elevator system comprising a plurality of cars for serving a plurality of floors divided into a normal zone and a demand zone, a stopping means for each car, a reversing means for each car, an up call device and a down call device for each floor for causing the stopping means of the cars to stop them thereat when they are in condition to make such stops, a service demand circuit for each car, a plurality of counting resistors, one for each car for each floor in the demand zone, for controlling the flow of energy through the demand circuit, a timing device associated with each down call device in the demand zone, means responsive to operation of a down call device for a floor in the demand zone for connecting the counting resistor of each car for that floor to a supply conductor, and for starting the timing device for that floor in operation, means responsive to operation of the timing device for a floor for consecutively reducing the effective length of each of the counting resistors for that floor upon the expiration of predetermined periods of time, a plurality of pick-up switches for each car operable by up movement of that car to sequentially connect the counting resistors of that car in parallel in the service demand circuit, a demand device disposed in the demand circuit of each car and operable by a predetermined flow of energy therein resulting from operation of the down call devices in the demand zone, the timing devices and the pick-up switches, and means responsive to operation of a demand device for operating the stopping means and the reversing means of the car associated with that demand device so that it may answer down stop calls below it.

15. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, said control means including means responsive to failure of the system to answer an operated one of said call devices within a predetermined time for initiating a stopping operation of the car when the car is approaching the floor of the last-named call device in a second direction opposite to the first direction, the predetermined time for certain of the call devices differing from the predetermined time of other of the call devices.

16. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, said control means including means for totalizing the delay in answering a plurality of operated ones of said call devices, and means responsive to the totalized delay in excess of a predetermined value for initiating the stopping and reversing of the car when traveling in a second direction opposite to the first direction at a floor for which the associated call device has been operated.

17. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, said control means including means for initiating the stopping and reversing of the car when traveling in a second direction opposite to the first direction at a floor at which the call device is operated in response to the expiration of a predetermined time before an operated one of said call devices has been answered, said last-named means being effective for initiating the stopping and reversing of the car at a floor at which the call device is operated in response to the expiration of a time less than said predetermined time before two operated ones of said call devices have been answered.

18. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, said control means including means for initiating the stopping and reversing the car when traveling in a second direction which is opposite the first direction at a floor at which the call device is operated in response to the expiration of a predetermined total time before a predetermined number of operated ones of said call devices are answered, said last-named means being effective for initiating the stopping and reversing of the car when traveling in the second direction at a floor at which the call device is operated in response to the expiration of a preselected time, which is more than said predetermined time, before the answering of call devices when the number of operated ones of said call devices is less than said predetermined number.

19. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, the floors of said structure being divided into a first zone of floors and a second zone of floors, and means responsive to failure of the system to answer a predetermined number of operated ones of the call devices for the first zone of floors within a predetermined time to initiate the stopping and reversing of the car when traveling in the second direction in the second zone at the first floor approached by the car at which one of the call devices has been operated.

20. In an elevator system, an elevator car, a structure having a plurality of floors to be served by the elevator car, driving means for the elevator car, stopping means for stopping the car at each of said floors, reversing means for reversing the direction of travel of the car, a stop call device for each of said floors, and control means responsive to operation of the stop call device for any of the floors for cooperating with the stopping means to stop the car at the associated floor when the car is approaching the associated floor in a first direction, said control means comprising means for totalizing the delay in answering operated ones of said call devices for floors at and below the car, and means responsive to the totalized delay in excess of a predetermined value for initiating the stopping and reversing of the car when traveling in the second direction at the next floor at which one of said call devices has been operated.

21. In an elevator system, a plurality of elevator cars, a structure having a plurality of floors to be served by the elevator car, driving means for each of the elevator cars, stopping means for stopping each of the elevator cars at any of said floors, reversing means for reversing the direction of travel of each of the cars, a stop call device for each of the floors, and control means responsive to operation of the call device for any of the floors for cooperating with the stopping means to stop at the associated floor any of the cars approaching the floor of the operated call device in a first direction, said control means comprising service demand means for measuring the time required for the system to answer any of a predetermined number of said call devices which have been operated, assignment means responsive to a service demand for assigning said cars traveling in a second direction opposite to said first direction to stop and reverse at the floor of an operated one of the call devices, said assignment means being effective only in response to a service demand in excess of a predetermined value for effecting said assignment of a first one of the cars, and means operating during said assignment of a first one of the cars for effecting the assignment of a second one of the cars only if the service demand is in excess of a value greater than said predetermined value.

22. In an elevator system, a plurality of elevator cars, a structure having a plurality of floors to be served by the elevator car, driving means for each of the elevator cars, stopping means for stopping each of the elevator cars at any of said floors, reversing means for reversing the direction of travel of each of the cars, a stop call device for each of the floors, and control means responsive to operation of the call device for any of the floors for cooperating with the stopping means to stop at the associated floor any of the cars approaching the floor of the operated call device in a first direction, said control means comprising service demand means for measuring the time required for the system to answer any of a predetermined number of said call devices which have been operated, assignment means responsive to a service demand for assigning said cars traveling in a second direction opposite to said first direction to stop and reverse at the floor of an operated one of the call devices, and means for independently establishing the value of the service demand required to effect said assignment for each of said cars.

23. In an elevator system, a plurality of elevator cars, a structure having a plurality of floors to be served by the elevator car, said floors being divided into a first zone of floors and a second zone of floors, driving means for each of the elevator cars, stopping means for stopping each of the elevator cars at any of said floors, reversing means for reversing the direction of travel of each of the cars, a stop call device for each of the floors, and control means responsive to operation of the call device for any of the floors for cooperating with the stopping means to stop at the associated floor any of the cars approaching the floor of the operated call device in a first direction, said control means comprising service demand means for measuring the time required for the system to answer any of a predetermined number of said call devices of the first zone of floors which have been operated, assignment means responsive to a service demand in excess of a value which varies as a function of the number of the operated call devices in the first zone for assigning said cars traveling in a second direction opposite to said first direction to stop and reverse at the floor of an operated one of the call devices.

24. A system as claimed in claim 23 wherein the service demand means is separately provided for each of the cars, each of said service demand means being responsive only to the operated call devices in the first zone located at and below the position of the associated car.

25. An elevator system having an elevator car, a structure having a plurality of floors to be served by the elevator car, driving means for the elevator car, stopping means for stopping the elevator car at each of the floors, reversing means for reversing the direction of travel of the car, a stop call device for each of the floors, and control means responsive to operation of the stop call device for any of the floors for cooperating with the stopping means to stop the car at the associated floor when the car approaches the associated floor in a first direction, in combination with a relay, a circuit for energizing the relay in accordance with the number of operated call devices and in accordance with the time that the operated call devices remain unanswered, and circuit connections controlled by the relay for placing the control means, the stopping means and the reversing means in condition to stop and reverse the car when traveling in a second direction opposite to the first direction at one of the floors having an operated one of the call devices.

26. An elevator system as defined in claim 25 wherein the circuit for energizing the relay is effective for energizing the relay in accordance only with the number of operated call devices for floors at and below the position of the car and in accordance with the time that the last-named call devices remain unanswered.

27. An elevator system as defined in claim 25 wherein the degree of energization of the relay differs for the respective devices of said number of operated call devices.

WILLIAM F. EAMES.

REFERENCES CITED

The following references are of record in the file of this patent:

UNITED STATES PATENTS

| Number | Name | Date |
|---|---|---|
| 2,074,575 | Waters et al. | Mar. 23, 1937 |
| 2,103,123 | Stevens | Dec. 21, 1937 |
| 2,148,913 | Stevens | Feb. 28, 1939 |